United States Patent
Gaalema et al.

(10) Patent No.: US 12,392,896 B2
(45) Date of Patent: Aug. 19, 2025

(54) CIRCUIT FOR MEASURING PULSE ENERGY IN A LIDAR SYSTEM

(71) Applicant: Luminar Technologies, Inc., Orlando, FL (US)

(72) Inventors: Stephen D. Gaalema, Colorado Springs, CO (US); Gary Lee Kline, Orlando, FL (US)

(73) Assignee: Luminar Technologies, Inc., Orlando, FL (US)

( * ) Notice: Subject to any disclaimer, the term of this patent is extended or adjusted under 35 U.S.C. 154(b) by 1092 days.

(21) Appl. No.: 17/318,779

(22) Filed: May 12, 2021

(65) Prior Publication Data

US 2022/0381911 A1 Dec. 1, 2022

(51) Int. Cl.
*G01S 17/10* (2020.01)
*G01B 11/22* (2006.01)
*G01N 21/55* (2014.01)
*G01S 7/481* (2006.01)
*G01S 7/4865* (2020.01)
*G01S 17/89* (2020.01)

(52) U.S. Cl.
CPC .............. *G01S 17/10* (2013.01); *G01B 11/22* (2013.01); *G01N 21/55* (2013.01); *G01S 7/4816* (2013.01); *G01S 7/4817* (2013.01); *G01S 7/4865* (2013.01); *G01S 17/89* (2013.01)

(58) Field of Classification Search
CPC .............................. G01S 7/4861; G01B 11/22
See application file for complete search history.

(56) References Cited

U.S. PATENT DOCUMENTS

| 6,240,283 B1 * | 5/2001 | Holcombe | H04B 10/114 375/345 |
| 7,642,766 B2 * | 1/2010 | Masson | G11C 27/026 324/76.38 |
| 10,991,261 B1 * | 4/2021 | Tiana | G01C 5/005 |

(Continued)

FOREIGN PATENT DOCUMENTS

DE 102005041466 A1 * 3/2007 ............. G01S 17/42

OTHER PUBLICATIONS

Cometti, Simona & Mazza, Giovanni. (2018). Design of the New Front-End Electronics for the Readout of the Upgraded CMS Electromagnetic Calorimeter for the HL-LHC. 106. 10.22323/1.313.0106. (Year: 2018).*

(Continued)

*Primary Examiner* — Yuqing Xiao
*Assistant Examiner* — Clara G Chilton
(74) *Attorney, Agent, or Firm* — Van Pelt, Yi & James LLP

(57) ABSTRACT

A receiver of a lidar system configured to receive one or more scattered light pulses from a target in a field of regard of the lidar system. The receiver includes a detector that emits an electric signal representative of the received light pulse in response to detecting the received light pulse. The receiver further includes one or more analog circuits configured to receive the electric signal from the detector, sample one or more voltages of the electric signal, and determine the energy of the received light pulse based at least on the one or more sampled voltages. The lidar system may further calculate a reflectivity and/or other characteristics of the target based at least on the energy of the received light pulse.

29 Claims, 10 Drawing Sheets

(56) References Cited

U.S. PATENT DOCUMENTS

| | | | | |
|---|---|---|---|---|
| 2006/0139713 | A1* | 6/2006 | Yee | G02B 26/105 |
| | | | | 359/904 |
| 2015/0244469 | A1* | 8/2015 | Murayama | H04J 14/0227 |
| | | | | 398/34 |
| 2016/0054434 | A1* | 2/2016 | Williams | G01S 7/4865 |
| | | | | 356/5.01 |
| 2017/0139041 | A1* | 5/2017 | Drader | G01S 7/4914 |
| 2019/0302240 | A1* | 10/2019 | Webster | G01S 17/894 |
| 2020/0033456 | A1* | 1/2020 | Wang | G04F 10/005 |
| 2022/0206122 | A1* | 6/2022 | Humphrey | G01S 7/4817 |

OTHER PUBLICATIONS

International Search Report and Written Opinion for PCT/US2022/027799 dated Jul. 27, 2022.

Mengel et al., "Fast Range Imaging by CMOS Sensor Array Through Multiple Double Short Time Integration (MDSI)," Proceedings 2001 International Conference on Image Processing, Oct. 7- 10, 2001, Institute of Electrical and Electronics Engineers, New York, NY, vol. 2, Oct. 7, 2001.

* cited by examiner

CIRCUIT FOR MEASURING PULSE ENERGY IN A LIDAR SYSTEM

FIELD OF TECHNOLOGY

This disclosure relates generally to light detection and ranging (lidar) systems and, more specifically, to a circuit for measuring energy of a received light pulse.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Light detection and ranging (LIDAR or lidar) is a technology that can be used to measure distances to remote targets. Typically, a lidar system includes a light source and an optical receiver. The light source can be, for example, a laser which emits light having a particular operating wavelength. The operating wavelength of a lidar system may lie, for example, in the infrared, visible, or ultraviolet portions of the electromagnetic spectrum. The light source emits light toward a target which then scatters the light. A receiver may receive some of the scattered light scattered back towards the lidar system. The system determines the distance to the target based on one or more characteristics associated with the returned light. For example, the system may determine the distance to the target based on the time of flight of a returned light pulse.

In addition to determining the distance to a remote target, lidar can be used to determine the pulse energy of light scattered off of a remote target. This can be used, among other things, to determine the reflectivity of the target. However, the current techniques in the art are costly, complicated, and inefficient. For example, Digital Pulse Reconstruction requires a large number of comparators and respective time delay measuring circuits, and also results in higher power dissipation.

SUMMARY

A lidar system of the present disclosure emits light pulses using a light source; detects a scattered light pulse using a detector, when some of the emitted light reaches a remote target; and uses an analog circuit to determine the amount of energy in the received light pulse. The analog circuit in an example implementation includes a correlated double-sampling (CDS) circuit component configured to compare voltage samples, such as a low-voltage sample corresponding to the low threshold and a high-voltage sample corresponding to the peak or near-peak of the signal from the detector. The voltage signal may travel through an analog delay line coupled to the input of the CDS circuit component. The analog circuit can also include a comparator configured to trigger on and provide an indication to take the low-voltage sample to the CDS circuit component. The analog circuit may further include a digital delay line to provide an indication to obtain the high-voltage sample to the CDS circuit component.

In some implementations, the lidar system includes multiple instances of the analog circuit to detect respectively high voltage gains, low voltage gains, and ultra-low voltage gains. A detector (e.g., an avalanche photodiode) in a receiver detects a light pulse and generates an electric current proportional to the pulse. An integrator converts the electric current to an analog voltage signal and provides the voltage signal at an input of at least one analog circuit, such as the high-gain analog circuit. For other analog circuits, the lidar system can provide a voltage signal corresponding to the anode voltage of the detector.

One example embodiment of these techniques is a lidar system that includes a light source configured to emit light pulses and a receiver configured to receive light pulses from some of the light pulses scattered by one or more targets. The receiver includes a detector configured to detect a light pulse and output an electric signal corresponding to the detected light pulse; a pulse detection circuit configured to determine, based on the electric signal, a time of arrival of the detected light pulse; and an analog circuit configured to generate, based on the electric signal, an output signal indicative of an amount of energy contained in the detected light pulse.

Another example embodiment of these techniques is a method in a lidar system for processing light pulses. The method includes emitting light pulses by a light source; generating, by a detector, an electric signal corresponding to a light pulse from one of the light pulses scattered by a target; determining, by a pulse detection circuit and based on the electrical signal, a time of arrival of the detected light pulse; and generating, by an analog circuit and based on the electric signal, an output signal indicative of an amount of energy contained in the detected light pulse.

DETAILED DESCRIPTION

Figure 1:
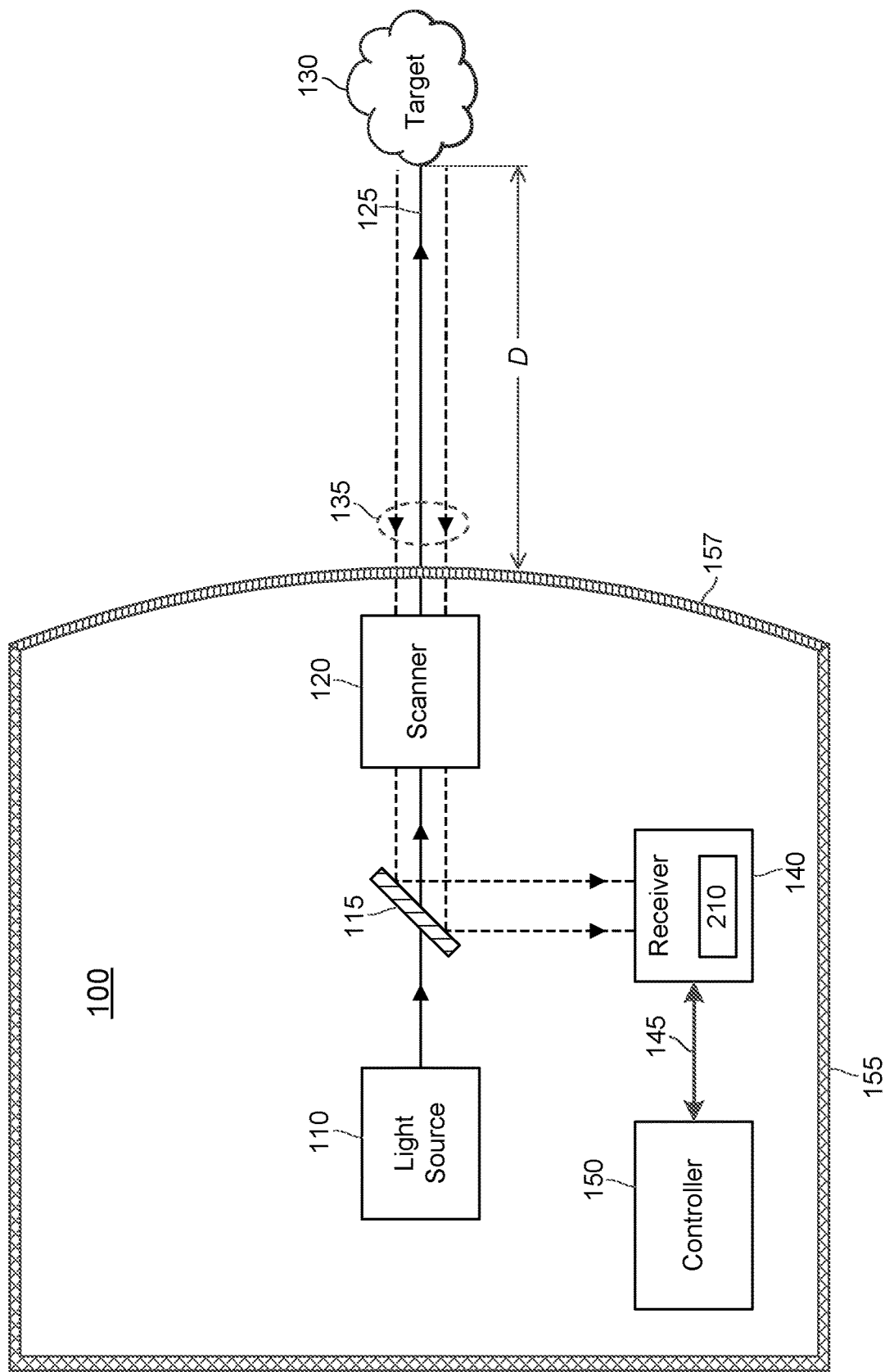
FIG. 1 illustrates a block diagram of an example lidar system in which the analog circuit of this disclosure can be implemented.

As discussed in detail below, a lidar system of this disclosure uses an analog circuit to efficiently and accurately determine the amount of energy in a received light pulse. These techniques eliminate the need to implement Digital Pulse Reconstruction or other approaches that require specialized hardware.

For clarity, an example system in which these techniques can be utilized is discussed with reference to FIG. 1, followed by a discussion of circuit that implement these techniques and an example method for operating such a circuit.

Example System Architecture

The lidar system 100 may be referred to as a laser ranging system, a laser radar system, a LIDAR system, a lidar sensor, or a laser detection and ranging (LADAR or ladar) system. The lidar system 100 may include a light source 110, a mirror 115, a scanner 120, a receiver 140 including at least one analog circuit 210, and a controller 150. The light source 110 may be, for example, a laser which emits light having a particular operating wavelength in the infrared, visible, or ultraviolet portions of the electromagnetic spectrum. As a more specific example, the light source 110 may include a laser with an operating wavelength between approximately 1.2 μm and 1.7 μm.

In operation, the light source 110 emits an output beam of light 125 which may be continuous-wave, pulsed, or modulated in any suitable manner for a given application. The output beam of light 125 is directed downrange toward a remote target 130 located a distance D from the lidar system 100 and at least partially contained within a field of regard of the system 100. Depending on the scenario and/or the implementation of the lidar system 100, D can be between 1 m and 1 km, for example.

Once the output beam 125 reaches the downrange target 130, the target 130 may scatter or, in some cases, reflect at least a portion of light from the output beam 125, and some of the scattered or reflected light may return toward the lidar system 100. In the example of FIG. 1, the scattered or reflected light is represented by input beam 135, which passes through the scanner 120 to the mirror 115, which may be referred to as an overlap mirror, superposition mirror, or beam-combiner mirror. The mirror 115 in turn directs the input beam 135 to the receiver 140. The input 135 may contain only a relatively small fraction of the light from the output beam 125. For example, the ratio of average power, peak power, or pulse energy of the input beam 135 to average power, peak power, or pulse energy of the output beam 125 may be approximately $10^{-1}$, $10^{-2}$, $10^{-3}$, $10^{-4}$, $10^{-5}$, $10^{-6}$, $10^{-7}$, $10^{-8}$, $10^{-9}$, $10^{-10}$, $10^{-11}$, or $10^{-12}$. As another example, if a pulse of the output beam 125 has a pulse energy of 1 microjoule (μJ), then the pulse energy of a corresponding pulse of the input beam 135 may have a pulse energy of approximately 10 nanojoules (nJ), 1 nJ, 100 picojoules (pJ), 10 pJ, 1pJ, 100 femtojoules (fJ), 10 fJ, 1 fJ, 100 attojoules (aJ), 10 aJ, or 1 aJ.

The output beam 125 may be referred to as a laser beam, light beam, optical beam, emitted beam, or just beam; the input beam 135 may be referred to as a return beam, received beam, return light, received light, input light, scattered light, or reflected light. As used herein, scattered light may refer to light that is scattered or reflected by the target 130. The input beam 135 may include light from the output beam 125 that is scattered by the target 130, light from the output beam 125 that is reflected by the target 130, or a combination of scattered and reflected light from target 130.

The operating wavelength of a lidar system 100 may lie, for example, in the infrared, visible, or ultraviolet portions of the electromagnetic spectrum. The sun also produces light in these wavelength ranges, and thus sunlight can act as background noise which can obscure signal light detected by the lidar system 100. The solar background noise can result in false-positive detections or can otherwise corrupt measurements of the lidar system 100, especially when the receiver 140 includes SPAD detectors (which can be highly sensitive).

Generally speaking, the light from the sun that passes through Earth's atmosphere and reaches a terrestrial-based lidar system such as the system 100 can establish an optical background noise for the system. Thus, in order for a signal from the lidar system 100 to be detectable, the signal must rise above the background noise floor. It is generally possible to increase the signal-to-noise ratio (SNR) of the lidar system 100 by raising the power level of the output beam 125, but in some situations it may be desirable to keep the power level of the output beam 125 relatively low. For example, increasing the transmit power levels of the output beam 125 can result in the lidar system 100 becoming hazardous to human eyes.

In some implementations, the lidar system 100 operates at one or more wavelengths between approximately 1400 nm and approximately 1600 nm. For example, the light source 110 may produce light at approximately 1550 nm.

In some implementations, the lidar system 100 operates at frequencies at which atmospheric absorption is relatively low. For example, the lidar system 100 can operate at wavelengths in the approximate ranges from 980 nm to 1110 nm or from 1165 nm to 1400 nm.

According to some implementations, the lidar system 100 can include an eye-safe laser, or the lidar system 100 can be classified as an eye-safe laser system or laser product. An eye-safe laser, laser system, or laser product may refer to a system with an emission wavelength, average power, peak power, peak intensity, pulse energy, beam size, beam divergence, exposure time, or scanned output beam such that emitted light from the system presents little or no possibility of causing damage to a person's eyes. For example, the light source 110 or lidar system 100 may be classified as a Class 1 laser product (as specified by the 60825-1 standard of the International Electrotechnical Commission (IEC)) or a Class 1 laser product (as specified by Title 21, Section 1040.10 of the United States Code of Federal Regulations (CFR)) that is safe under all conditions of normal use. In some implementations, the lidar system 100 may be classified as an eye-safe laser product (e.g., with a Class 1 IEC or Class 1 CFR classification) operating at any suitable wavelength between approximately 1400 nm and approximately 2100 nm. In some implementations, the light source 110 may include a laser with an operating wavelength between approximately 1400 nm and approximately 1600 nm, and the lidar system 100 may operate in an eye-safe manner. In some implementations, the light source 110 or the lidar system 100 may be an eye-safe laser product that includes a scanned laser with an operating wavelength between approximately 1530 nm and approximately 1560 nm. In some implementations, the lidar system 100 may be a Class 1 IEC or Class 1 CFR laser product that includes a fiber laser or solid-state laser with an operating wavelength between approximately 1400 nm and approximately 1600 nm.

The receiver 140 may receive or detect photons from the input beam 135 and generate one or more representative signals. For example, the receiver 140 may generate an output electrical signal 145 that is representative of the input beam 135. The receiver may send the electrical signal 145 to the controller 150. Depending on the implementation, the controller 150 may include one or more processors, an application-specific integrated circuit (ASIC), a field-programmable gate array (FPGA), and/or other suitable circuitry configured to analyze one or more characteristics of the electrical signal 145 to determine one or more characteristics of the target 130, such as its distance downrange from the lidar system 100. More particularly, the controller 150 may analyze the time of flight or phase modulation for the beam of light 125 transmitted by the light source 110. If the lidar system 100 measures a time of flight of T (e.g., T represents a round-trip time of flight for an emitted pulse of light to travel from the lidar system 100 to the target 130 and back to the lidar system 100), then the distance D from the target 130 to the lidar system 100 may be expressed as D=c*T/2, where c is the speed of light (approximately $3.0 \times 10^8$ m/s).

As a more specific example, if the lidar system 100 measures the time of flight to be T=300 ns, then the lidar system 100 can determine the distance from the target 130 to the lidar system 100 to be approximately D=45.0 m. As another example, the lidar system 100 measures the time of flight to be T=1.33 μs and accordingly determines that the distance from the target 130 to the lidar system 100 is approximately D=199.5 m. The distance D from lidar system 100 to the target 130 may be referred to as a distance, depth, or range of the target 130. As used herein, the speed of light c refers to the speed of light in any suitable medium, such as for example in air, water, or a vacuum. The speed of light in a vacuum is approximately $2.9979 \times 10^8$ m/s, and the speed of light in air (which has a refractive index of approximately 1.0003) is approximately $2.9970 \times 10^8$ m/s.

The target 130 may be located a distance D from the lidar system 100 that is less than or equal to a maximum range $R_{MAX}$ of the lidar system 100. The maximum range $R_{MAX}$ (which also may be referred to as a maximum distance) of a lidar system 100 may correspond to the maximum distance over which the lidar system 100 senses and/or identifies targets that appear in a field of regard of the lidar system 100. The maximum range of lidar system 100 may be any suitable distance, such as for example, 25 m, 50 m, 100 m, 200 m, 500 m, or 1 km. As a specific example, a lidar system with a 200-m maximum range may sense or identify various targets located up to 200 m away. For a lidar system with a 200-m maximum range ($R_{MAX}$=200 m), the time of flight corresponding to the maximum range is approximately $$2 \cdot \frac{R_{MAX}}{c} \approx 1.33 \ \mu s.$$

In some implementations, a single housing 155 may contain the light source 110, the scanner 120, and the receiver 140. The housing 155 may be a box, case, or enclosure that holds or contains all or part of a lidar system 100. The housing 155 includes a window 157 through which the beams 125 and 135 pass. In one example implementation, the lidar-system housing 155 contains the light source 110, the overlap mirror 115, the scanner 120, and the receiver 140 of a lidar system 100. The controller 150 may reside within the same housing 155 as the components 110, 12, and 140, or the controller 150 may reside remotely from the housing 155.

Moreover, in some implementations, the housing 155 includes multiple lidar sensors, each including a respective scanner and a receiver. Depending on the particular implementation, each of the multiple sensors can include a separate light source or a common light source. The multiple sensors may cover non-overlapping adjacent fields of regard or partially overlapping fields of regard depending on the implementation.

The housing 155 may be an airtight or watertight structure that prevents water vapor, liquid water, dirt, dust, or other contaminants from getting inside the housing 155. The housing 155 may be filled with a dry or inert gas, such as for example dry air, nitrogen, or argon. The housing 155 may include one or more electrical connections for conveying electrical power or electrical signals to and/or from the housing.

The window 157 may use any suitable substrate material, such as, for example, glass or plastic (e.g., polycarbonate, acrylic, cyclic-olefin polymer, or cyclic-olefin copolymer). The window 157 may include an interior surface (surface A) and an exterior surface (surface B), and surface A or surface B may include a dielectric coating having particular reflectivity values at particular wavelengths. A dielectric coating (which may be referred to as a thin-film coating, interference coating, or coating) may include one or more thin-film layers of dielectric materials (e.g., $SiO_2$, $TiO_2$, $Al_2O_3$, $Ta_2O_5$, $MgF_2$, $LaF_3$, or $AlF_3$) having particular thicknesses (e.g., thickness less than 1 μm) and particular refractive indices. A dielectric coating may be deposited onto surface A or surface B of the window 157 using any suitable deposition technique, such as, for example, sputtering or electron-beam deposition.

The dielectric coating may have a high reflectivity at a particular wavelength or a low reflectivity at a particular wavelength. A high-reflectivity (HR) dielectric coating may have any suitable reflectivity value (e.g., a reflectivity greater than or equal to 80%, 90%, 95%, or 99%) at any suitable wavelength or combination of wavelengths. A low-reflectivity dielectric coating (which may be referred to as an anti-reflection (AR) coating) may have any suitable reflectivity value (e.g., a reflectivity less than or equal to 5%, 2%, 1%, 0.5%, or 0.2%) at any suitable wavelength or combination of wavelengths. In particular embodiments, a dielectric coating may be a dichroic coating with a particular combination of high or low reflectivity values at particular wavelengths. For example, a dichroic coating may have a reflectivity of less than or equal to 0.5% at approximately 1550-1560 nm and a reflectivity of greater than or equal to 90% at approximately 800-1500 nm.

In some implementations, surface A or surface B has a dielectric coating that is anti-reflecting (AR) at an operating wavelength of one or more light sources 110 contained within enclosure 155. An AR coating on surface A and surface B may increase the amount of light at an operating wavelength of the light source 110 that is transmitted through the window 157. Additionally, an AR coating at an operating wavelength of the light source 110 may reduce the amount of incident light from output beam 125 that is reflected by the window 157 back into the housing 155. In an example implementation, each of surface A and surface B has an AR coating with reflectivity less than 0.5% at an operating wavelength of light source 110. As an example, if the light source 110 has an operating wavelength of approximately 1550 nm, then surface A and surface B may each have an AR coating with a reflectivity that is less than 0.5% from approximately 1547 nm to approximately 1553 nm. In another implementation, each of surface A and surface B has an AR coating with reflectivity less than 1% at the operating wavelengths of the light source 110. For example, if the housing 155 encloses two sensor heads with respective light sources, the first light source emits pulses at a wavelength of approximately 1535 nm and the second light source emits pulses at a wavelength of approximately 1540 nm, then surface A and surface B may each have an AR coating with reflectivity less than 1% from approximately 1530 nm to approximately 1545 nm.

The window 157 may have an optical transmission that is greater than any suitable value for one or more wavelengths of one or more light sources 110 contained within the housing 155. As an example, the window 157 may have an optical transmission of greater than or equal to 70%, 80%, 90%, 95%, or 99% at a wavelength of light source 110. In one example implementation, the window 157 can transmit greater than or equal to 95% of light at an operating wavelength of the light source 110. In another implementation, the window 157 transmits greater than or equal to 90% of light at the operating wavelengths of the light sources enclosed within the housing 155.

Surface A or surface B may have a dichroic coating that is anti-reflecting at one or more operating wavelengths of one or more light sources 110 and high-reflecting at wavelengths away from the one or more operating wavelengths. For example, surface A may have an AR coating for an operating wavelength of the light source 110, and surface B may have a dichroic coating that is AR at the light-source operating wavelength and HR for wavelengths away from the operating wavelength. A coating that is HR for wavelengths away from a light-source operating wavelength may prevent most incoming light at unwanted wavelengths from being transmitted through the window 117. In one implementation, if the light source 110 emits optical pulses with a wavelength of approximately 1550 nm, then surface A may have an AR coating with a reflectivity of less than or equal to 0.5% from approximately 1546 nm to approximately 1554 nm. Additionally, surface B may have a dichroic coating that is AR at approximately 1546-1554 nm and HR (e.g., reflectivity of greater than or equal to 90% at approximately 800-1500 nm and approximately 1580-1700 nm.

Surface B of the window 157 may include a coating that is oleophobic, hydrophobic, or hydrophilic. A coating that is oleophobic (or lipophobic) may repel oils (e.g., fingerprint oil or other non-polar material) from the exterior surface (surface B) of the window 157. A coating that is hydrophobic may repel water from the exterior surface. For example, a material that is both oleophobic and hydrophobic may coat surface B. A coating that is hydrophilic attracts water so that water may tend to wet and form a film on the hydrophilic surface (rather than forming beads of water as may occur on a hydrophobic surface). If surface B has a hydrophilic coating, then water (e.g., from rain) that lands on surface B may form a film on the surface. The surface film of water may result in less distortion, deflection, or occlusion of an output beam 125 than a surface with a non-hydrophilic coating or a hydrophobic coating.

With continued reference to FIG. 1, the light source 110 may include a pulsed laser or a pulsed light-emitting diode (LED) configured to produce or emit pulses of light with a certain pulse duration. In an example implementation, pulse duration or pulse width of the pulsed laser is approximately 10 picoseconds (ps) to 20 nanoseconds (ns). In another implementation, the light source 110 is a pulsed laser that produces pulses with a pulse duration of approximately 1-4 ns. In yet another implementation, the light source 110 is a pulsed laser that produces pulses at a pulse repetition frequency of approximately 100 kHz to 5 MHz or a pulse period (e.g., a time between consecutive pulses) of approximately 200 ns to 10 µs. The light source 110 may have a substantially constant or a variable pulse repetition frequency, depending on the implementation. As an example, the light source 110 may be a pulsed laser that produces pulses at a substantially constant pulse repetition frequency of approximately 640 kHz (e.g., 640,000 pulses per second), corresponding to a pulse period of approximately 1.56 µs. As another example, the light source 110 may have a pulse repetition frequency that can be varied from approximately 500 kHz to 3 MHz. As used herein, a pulse of light may be referred to as an optical pulse, a light pulse, or a pulse, and a pulse repetition frequency may be referred to as a pulse rate.

In general, the output beam 125 may have any suitable average optical power, and the output beam 125 may include optical pulses with any suitable pulse energy or peak optical power. Some examples of the average power of the output beam 125 include the approximate values of 1 mW, 10 mW, 100 mW, 1 W, and 10 W. Example values of pulse energy of the output beam 125 include the approximate values of 0.1 µJ, 1 µJ, 10 µJ, 100 µJ, and 1 mJ. Examples of peak power values of pulses included in the output beam 125 are the approximate values of 10 W, 100 W, 1 kW, 5 kW, and 10 kW. An example optical pulse with a duration of 1 ns and a pulse energy of 1 µJ has a peak power of approximately 1 kW. If the pulse repetition frequency is 500 kHz, then the average power of the output beam 125 with 1 µJ pulses is approximately 0.5 W in this example.

The light source 110 may include a laser diode, such as a Fabry-Perot laser diode, a quantum well laser, a distributed Bragg reflected (DBR) laser, a distributed feedback (DFB) laser, or a vertical-cavity surface-emitting laser (VCSEL). The laser diode operating in the light source 110 may be an aluminum-gallium-arsenide (AlGaAs) laser diode, an indium-gallium-arsenide (InGaAs) laser diode, or an indium-gallium-arsenide-phosphide (InGaAsP) laser diode, or any other suitable diode. In some implementations, the light source 110 includes a pulsed laser diode with a peak emission wavelength of approximately 1400-1600 nm. Further, the light source 110 may include a laser diode that is current-modulated to produce optical pulses.

In some implementations, the light source 110 includes a pulsed laser diode followed by one or more optical-amplification stages. For example, the light source 110 may be a fiber-laser module that includes a current-modulated laser diode with a peak wavelength of approximately 1550 nm, followed by a single-stage or a multi-stage erbium-doped fiber amplifier (EDFA). As another example, the light source 110 may include a continuous-wave (CW) or quasi-CW laser diode followed by an external optical modulator (e.g., an electro-optic modulator), and the output of the modulator may be fed into an optical amplifier. In yet other implementations, the light source 110 may include a pulsed solid-state laser or a pulsed fiber laser.

In some implementations, the output beam of light 125 emitted by the light source 110 is a collimated optical beam with any suitable beam divergence, such as a divergence of approximately 0.1 to 3.0 milliradian (mrad). Divergence of the output beam 125 may refer to an angular measure of an increase in beam size (e.g., a beam radius or beam diameter) as the output beam 125 travels away from the light source 110 or the lidar system 100. The output beam 125 may have a substantially circular cross section with a beam divergence characterized by a single divergence value. For example, the output beam 125 with a circular cross section and a divergence of 1 mrad may have a beam diameter or spot size of approximately 10 cm at a distance of 100 m from the lidar system 100. In some implementations, the output beam 125 may be an astigmatic beam or may have a substantially elliptical cross section. In further implementations, two divergence values may characterize the output beam 125. As an example, the output beam 125 may have a fast axis and a slow axis, where the fast-axis divergence is greater than the slow-axis divergence. As another example, the output beam 125 may be an astigmatic beam with a fast-axis divergence of 2 mrad and a slow-axis divergence of 0.5 mrad.

The output beam of light 125 emitted by light source 110 may be unpolarized or randomly polarized, may have no specific or fixed polarization (e.g., the polarization may vary with time), or may have a particular polarization (e.g., the output beam 125 may be linearly polarized, elliptically polarized, or circularly polarized). As an example, the light source 110 may produce linearly polarized light, and the lidar system 100 may include a quarter-wave plate that converts the linearly polarized light into circularly polarized light. The lidar system 100 may transmit the circularly polarized light as the output beam 125, and receive the input beam 135, which may be substantially or at least partially circularly polarized in the same manner as the output beam 125 (e.g., if the output beam 125 is right-hand circularly polarized, then the input beam 135 may also be right-hand circularly polarized). The input beam 135 may pass through the same quarter-wave plate (or a different quarter-wave plate), converting the input beam 135 to linearly polarized light which is orthogonally polarized (e.g., polarized at a right angle) with respect to the linearly polarized light produced by light source 110. As another example, the lidar system 100 may employ polarization-diversity detection where two polarization components are detected separately. The output beam 125 may be linearly polarized, and the lidar system 100 may split the input beam 135 into two polarization components (e.g., s-polarization and p-polarization). In some embodiments, two photodiodes detect the two polarization components separately (e.g., a balanced photoreceiver that includes two photodiodes).

With continued reference to FIG. 1, the output beam 125 and input beam 135 may be substantially coaxial. In other words, the output beam 125 and input beam 135 may at least partially overlap or share a common propagation axis, so that the input beam 135 and the output beam 125 travel along substantially the same optical path (albeit in opposite directions). As the lidar system 100 scans the output beam 125 across a field of regard, the input beam 135 may follow along with the output beam 125 so that the coaxial relationship between the two beams is maintained.

The lidar system 100 also may include one or more optical components configured to condition, shape, filter, modify, steer, or direct the output beam 125 and/or the input beam 135. For example, the lidar system 100 may include one or more lenses mirrors, filters (e.g., bandpass or interference filters), beam splitters, polarizers, polarizing beam splitters, wave plates (e.g., half-wave or quarter-wave plates), diffractive elements, or holographic elements. In some implementations, the lidar system 100 includes a telescope, one or more lenses, or one or more mirrors to expand, focus, or collimate the output beam 125 to a desired beam diameter or divergence. As an example, the lidar system 100 may include one or more lenses to focus the input beam 135 onto an active region of the receiver 140. As another example, the lidar system 100 may include one or more flat mirrors or curved mirrors (e.g., concave, convex, or parabolic mirrors) to steer or focus the output beam 125 or the input beam 135. For example, the lidar system 100 may include an off-axis parabolic mirror to focus the input beam 135 onto an active region of receiver 140. As illustrated in FIG. 1, the lidar system 100 may include the mirror 115, which may be a metallic or dielectric mirror. In some embodiments, the mirror 115 may be configured so that the light beam 125 passes through the mirror 115. As an example, mirror 115 may include a hole, slot, or aperture through which the output light beam 125 passes. As another example, the mirror 115 may be configured so that at least 80% of the output beam 125 passes through the mirror 115 and at least 80% of the input beam 135 is reflected by the mirror 115. In some implementations, the mirror 115 may provide for the output beam 125 and the input beam 135 to be substantially coaxial, so that the beams 125 and 135 travel along substantially the same optical path, in opposite directions.

Generally speaking, the scanner 120 steers the output beam 125 in one or more directions downrange. The scanner 120 may include one or more scanning mirrors and one or more actuators driving the mirrors to rotate, tilt, pivot, or move the mirrors in an angular manner about one or more axes, for example. For example, the first mirror of the scanner may scan the output beam 125 along a first direction, and the second mirror may scan the output beam 125 along a second direction that is substantially orthogonal to the first direction. Example implementations of the scanner 120 are discussed in more detail below.

The scanner 120 may scan the output beam 125 over a 5-degree angular range, 20-degree angular range, 30-degree angular range, 60-degree angular range, or any other suitable angular range. For example, a scanning mirror may periodically rotate over a 15-degree range, which results in the output beam 125 scanning across a 30-degree range (e.g., a Θ-degree rotation by a scanning mirror results in a 2 Θ-degree angular scan of the output beam 125). A field of regard (FOR) of the lidar system 100 may refer to an area, region, or angular range over which the lidar system 100 may scan or capture distance information. When the lidar system 100 scans the output beam 125 within a 30-degree scanning range, the lidar system 100 may be referred to as having a 30-degree angular field of regard. As another example, a lidar system 100 with a scanning mirror that rotates over a 30-degree range may produce the output beam 125 that scans across a 60-degree range (e.g., a 60-degree FOR). In various implementations, the lidar system 100 may have a FOR of approximately 10°, 20°, 40°, 60°, 120°, or any other suitable FOR. The FOR also may be referred to as a scan region.

The scanner 120 may scan the output beam 125 horizontally and vertically, and the lidar system 100 may have a particular FOR along the horizontal direction and another particular FOR along the vertical direction. For example, the lidar system 100 may have a horizontal FOR of 10° to 120° and a vertical FOR of 2° to 45°.

The one or more scanning mirrors of the scanner 120 may be communicatively coupled to the controller 150 which may control the scanning mirror(s) so as to guide the output beam 125 in a desired direction downrange or along a desired scan pattern. In general, a scan pattern may refer to a pattern or path along which the output beam 125 is directed, and also may be referred to as an optical scan pattern, optical scan path, or scan path. As an example, the scanner 120 may include two scanning mirrors configured to scan the output beam 125 across a 60° horizontal FOR and a 20° vertical FOR. The controller 150 may cause two scanner mirrors to follow a scan path that substantially covers the 60°×20° FOR. The lidar system 100 can use the scan path to generate a point cloud with pixels that substantially covers the 60°×20° FOR. The pixels may be approximately evenly distributed across the 60°×20° FOR. Alternatively, the pixels may have a particular non-uniform distribution (e.g., the pixels may be distributed across all or a portion of the 60°×20° FOR, and the pixels may have a higher density in one or more particular regions of the 60°×20° FOR).

In operation, the light source 110 may emit pulses of light which the scanner 120 scans across a FOR of lidar system 100. The target 130 may scatter one or more of the emitted pulses, and the receiver 140 may detect at least a portion of the pulses of light scattered by the target 130.

The receiver 140 may be referred to as (or may include) a photoreceiver, optical receiver, optical sensor, detector, photodetector, optical detector. The receiver 140 in some implementations receives or detects at least a portion of the input beam 135 and produces an electrical signal that corresponds to the input beam 135. For example, if the input beam 135 includes an optical pulse, then the receiver 140 may produce an electrical current or voltage pulse that corresponds to the optical pulse detected by the receiver 140. In an example implementation, the receiver 140 includes one or more avalanche photodiodes (APDs) or one or more single-photon avalanche diodes (SPADs). In another implementation, the receiver 140 includes one or more PN photodiodes (e.g., a photodiode structure formed by a p-type semiconductor and an n-type semiconductor) or one or more PIN photodiodes (e.g., a photodiode structure formed by an undoped intrinsic semiconductor region located between p-type and n-type regions). In further implementations, the receiver 140 may include one or more analog circuits 210 to measure energy of a received pulse, as discussed in FIG. 2.

The receiver 140 may have an active region or an avalanche-multiplication region that includes silicon, germanium, or InGaAs. The active region of receiver 140 may have any suitable size, such as, for example, a diameter or width of approximately 50-500 µm. The receiver 140 may include circuitry that performs signal amplification, sampling filtering, signal conditioning, analog to digital conversion, time to digital conversion, pulse detection, threshold detection, rising-edge detection, or falling-edge detection. For example, the receiver 140 may include a transimpedance amplifier that converts a received photocurrent (e.g., a current produced by an APD in response to a received optical signal) into a voltage signal. Alternatively or additionally, the receiver 140 may include a low noise and/or charge amplifier that further functions as an integrator. The receiver 140 may direct the voltage signal to pulse-detection circuitry that produces an analog or digital output signal 145 that corresponds to one or more characteristics (e.g., rising edge, falling edge, amplitude, or duration) of a received optical pulse. For example, the pulse-detection circuitry may perform a time-to-digital conversion to produce a digital output signal 145. The receiver 140 may send the electrical output signal 145 to the controller 150 for processing or analysis, e.g., to determine a time-of-flight value corresponding to a received optical pulse.

The receiver 140 may further include an analog circuit configured to receive a light pulse 135 scattered from a target 130. The analog circuit may further determine the energy of the received light pulse 135. In some embodiments, the analog circuit may additionally or alternatively determine the energy of an emitted light pulse 125. Based on at least the determined energy of the received light pulse 135, the analog circuit may determine one or more further characteristics of the target 130. In some implementations, the analog circuit may determine one or more of a reflectivity, distance, material, shape, or other similar characteristic of a target 130.

Although the circuit is referred to in the present disclosure as an analog circuit, the analog circuit may include one or more digital components. In some embodiments, the digital components may include a comparator to provide timing information to the analog circuit. In further embodiments, the analog circuit may include an analog-to-digital (ADC) converter to allow for interaction with digital components of the lidar system 100.

The controller 150 may be electrically coupled or otherwise communicatively coupled to one or more of the light source 110, the scanner 120, and the receiver 140. The controller 150 may receive electrical trigger pulses or edges from the light source 110, where each pulse or edge corresponds to the emission of an optical pulse by the light source 110. The controller 150 may provide instructions, a control signal, or a trigger signal to the light source 110 indicating when the light source 110 should produce optical pulses. For example, the controller 150 may send an electrical trigger signal that includes electrical pulses, where the light source 110 emits an optical pulse in response to each electrical pulse. Further, the controller 150 may cause the light source 110 to adjust one or more of the frequency, period, duration, pulse energy, peak power, average power, or wavelength of the optical pulses produced by light source 110.

The controller 150 may determine a time-of-flight value for an optical pulse based on timing information associated with the time the pulse was emitted by light source 110 and the time the receiver 140 detected or received a portion of the pulse (e.g., the input beam 135). The controller 150 may include circuitry that performs signal amplification, sampling, filtering, signal conditioning, analog-to-digital conversion, time-to-digital conversion, pulse detection, threshold detection, rising-edge detection, or falling-edge detection.

As indicated above, the lidar system 100 and/or a computing device (not pictured) using the data gathered by the lidar system 100 may determine the distance to one or more downrange targets 130. By scanning the lidar system 100 across a field of regard, the lidar system 100 and/or the computing device can map the distance to a number of points within the field of regard. Each of these depth-mapped points may be referred to as a pixel or a voxel. The lidar system 100 and/or a computing device using the data gathered by the lidar system 100 may render a collection of pixels captured in succession (which may be referred to as a depth map, a point cloud, or a frame) as an image as an image or may analyze the collection of pixels to identify or detect objects or to determine a shape or distance of objects within the FOR. For example, a depth map may cover a field of regard that extends 60° horizontally and 15° vertically, and the depth map may include a frame of 100-2000 pixels in the horizontal direction by 4-400 pixels in the vertical direction.

The lidar system 100 may repeatedly capture or generate point clouds of a field of regard at any suitable frame rate between approximately 0.1 frames per second (FPS) and approximately 1000 FPS. For example, the lidar system 100 may generate point clouds at a frame rate of approximately 0.1 FPS, 0.5 FPS, 1 FPS, 2 FPS, 5 FPS, 10 FPS, 20 FPS, 100 FPS, 500 FPS, or 1000 FPS. In an example implementation, the lidar system 100 produces optical pulses at a rate of $5\times10^5$ pulses/second (e.g., the system may determine 500,000 pixel distances per second) and scans a frame of 1000×50 pixels (e.g., 50,000 pixels/frame), which corresponds to a point-cloud frame rate of 10 frames per second (e.g., 10 point clouds per second). The point-cloud frame rate may be substantially fixed or dynamically adjustable, depending on the implementation. For example, the lidar system 100 may capture one or more point clouds at a particular frame rate (e.g., 1 Hz) and then switch to capture one or more point clouds at a different frame rate (e.g., 10 Hz). In general, the lidar system can use a slower frame rate (e.g., 1 Hz) to capture one or more high-resolution point clouds, and use a faster frame rate (e.g., 10 Hz) to rapidly capture multiple lower-resolution point clouds.

Energy Measurement Circuit Architecture

Figure 2:
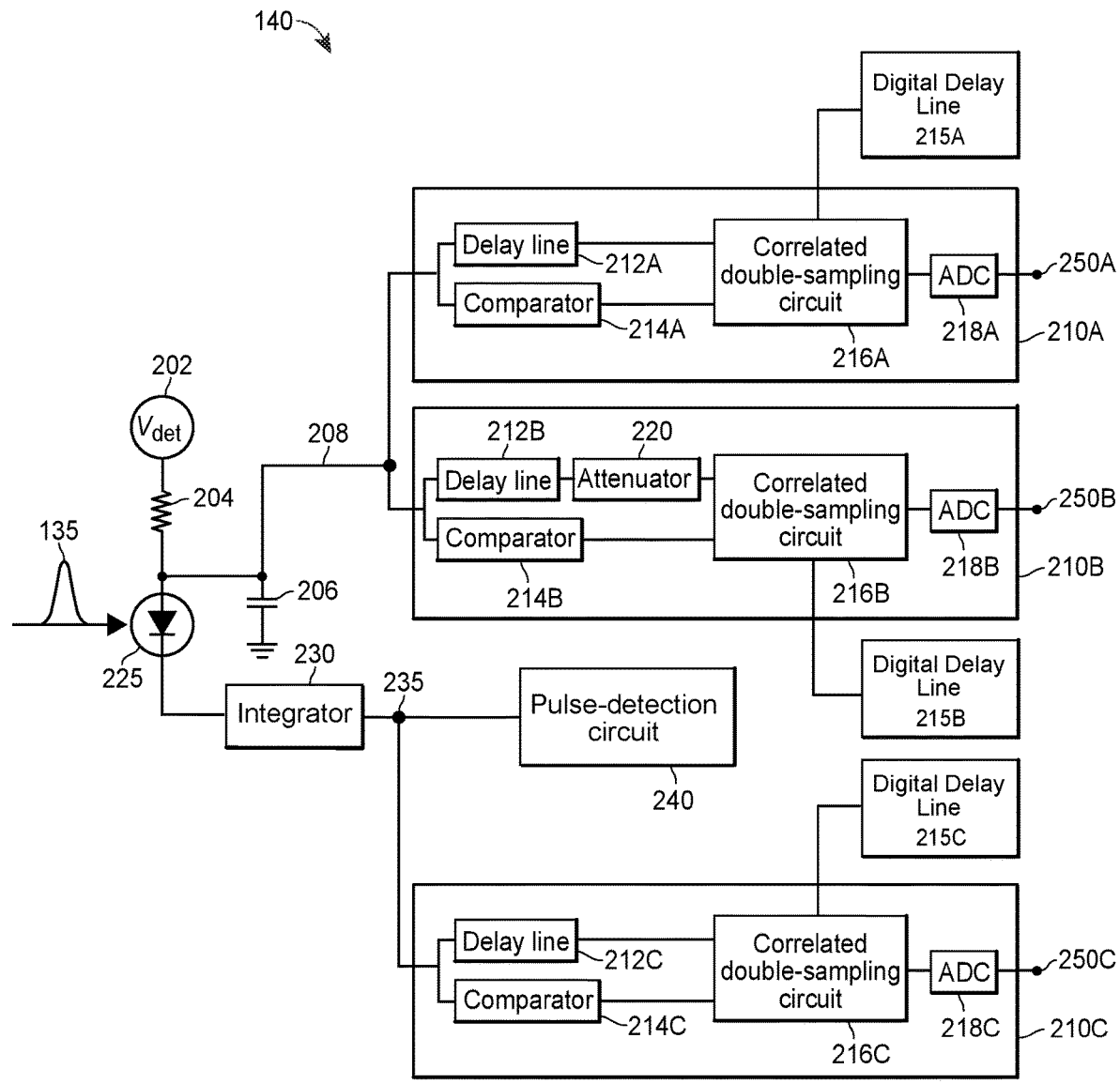
FIG. 2 illustrates a block diagram of an example receiver of a lidar system, including three analog circuits, in which a pulse of light is received and measured to determine the pulse energy of the pulse.

Turning now to FIG. 2, a receiver 140 may operate in a lidar system 100, and may include one or more analog circuits 210. The one or more analog circuits may receive a pulse of light 135 and determine the pulse energy of the pulse 135. The receiver 140 may include a detector 225 biased with a reverse voltage bias 202. The detector may be coupled to one or more analog circuits 210 and/or an integrator 230. Although FIG. 2 depicts the detector 225 coupled to the analog circuits 210 at the anode and coupled to the integrator 230 at the cathode, the opposite may be true as well. The receiver 140 may also include a pulse-detection circuit (PDC) 240. In some embodiments, the PDC may be coupled to the output of the integrator 230.

Depending on the embodiment, the receiver 140 may include any suitable number of analog circuits 210. For example, the receiver 140 may include three analog circuits: 210A, 210B, and 210C. In some embodiments, the analog circuits 210 may receive and measure pulses of different energy levels. For example, a receiver 140 may include (i) an analog circuit 210C configured to measure high gain (HG) signals, (ii) an analog circuit 210A configured to measure super-low gain signals (SLG), and (iii) an analog circuit 210B configured to measure ultra-low gain signals (ULG). In some implementations, HG signals may be signals with energy levels between 5 aJ and 2.5 fJ. In further implementations, SLG signals may be signals with energy levels between 500 aJ and 500 fJ. In still further implementations, ULG signals may be signals with energy levels between 50 fJ and 600 pJ.

Although the circuits 210 are referred to as analog circuits, in some embodiments the circuits 210 may include one or more digital components. For example, the analog circuits 210 may include a comparator 214 that may act as a timing element. The analog circuits 210 may also include an analog-to-digital converter (ADC) at the output of the circuit.

The analog circuits 210 may also include a correlated double-sampling circuit (CDSC or CDS circuit) 216A, as discussed with reference to FIGS. 5A and 5B below, as well as an analog delay line 214A that provides input to the CDSC 216A. In some embodiments, the analog circuits 210 may further include a digital delay line 215 to the CDSC for timing purposes. More specifically, a controller (e.g., the controller 150 of FIG. 1) can provide trigger signals to the CDSCs 216A-C via the digital delay line 215, so as to cause the CDSCs 216A-C to generate voltage samples at the corresponding times (see, for examples, points 432 and 434 in FIG. 4). Depending on the embodiment, the one or more analog circuits 210 may include an attenuator 220 to reduce the signal strength of the voltage signal being measured.

In the example embodiment of FIG. 2, the receiver 140 receives a light pulse 135 directed to a detector 225. In some implementations, the detector 225 is an avalanche photo-diode detector (APD) biased to a reverse bias voltage $V_{det}$ 202 close to a threshold voltage for the detector 225. The detector 225 may include such materials as silicon, germanium, indium-gallium-arsenide (InGaAs), gallium-nitride (GaN), mercury-cadmium-telluride (HgCdTe), or any other semiconductor material, as discussed below with reference to FIG. 7. In response to receiving the light pulse 135, the detector 225 emits an electric signal corresponding to the received light pulse. In some implementations, the electric signal is a current signal.

The integrator 230 then receives the current signal from the detector 225. The integrator 230 may act as a charge amplifier and convert the current signal from the detector 225 into an output voltage ($V_{paout}$) 235. In some embodiments, the integrator uses a feedback capacitor ($C_{int}$) to convert the current to the output voltage 235. The output voltage 235 can be calculated using the formula $$V_{paout} = V_0 + \frac{1}{C} \cdot \int (I \cdot dt).$$

The voltage is proportional to the energy of the signal $E = \int (P \cdot dt)$, where P is the signal power which is integrated over the time duration of the pulse.

In the example embodiment of FIG. 2, the output voltage 235 is used as an input to a PDC 240 and an analog circuit 210C, both of which are coupled to the output of the integrator 230. The PDC 240 may include a number of differentiators, comparators, and time-to-digital converters (TDCs), as described in more detail below in FIG. 8. In some embodiments, the PDC 240 may include three differentiators, each differentiator followed by a comparator 814 and a TDC 816 (both illustrated in FIG. 8). The PDC may receive an electrical signal from the integrator 230 and/or the detector 225 and may subsequently determine the time of arrival of the pulse of light 135 received at the detector 225. Using the arrival time, the PDC 240 may further determine the distance to the target 130. In some embodiments, the PDC 240 may determine the distance to the target 130 using one or more TDCs. In some implementations, the TDCs of PDC 240 may receive an electrical-edge signal from the comparator 814 and determine an interval of time between emission of a pulse of light by the light source and receipt of the electrical-edge signal, as described in FIG. 8 below.

With continued reference to FIG. 2, the analog circuit 210C uses the output voltage 235 as an input to measure HG signals. The analog circuit 210C receives the output voltage 235 at the analog delay line 212C and comparator 214C, both of which are coupled to the input of the analog circuit 210C. For sufficiently large signals (i.e. SLG or ULG signals), the integrator 230 may saturate, making any output voltage 235 unreliable for accurate measurement. The receiver may include analog circuits 210A and 210B, coupled to the anode or cathode of the detector 225. The analog circuits 210A and 210B may use the voltage at the detector 225 anode or cathode, $V_{deta}$ or $V_{detc}$, respectively, as an input.

In the example embodiment of FIG. 2, analog circuits 210A and 210B use the voltage at the anode of the detector 225 (i.e. $V_{deta}$ at 206) as an input to measure SLG and ULG signals, respectively. Depending on the embodiment, capacitor 206 may act as an integrator for analog circuits 210A and 210B. The analog circuits 210A and 210B receive the anode voltage at the analog delay lines 212A and 212B and comparators 214A and 214B, both of which are also coupled to the input of the analog circuits 210A and 210B, respectively. In some embodiments, the analog circuit for measuring ULG signals 210B may further include an attenuator 220 configured to reduce the voltage signal. In some implementations, the attenuator 220 may be coupled to the output of the delay line 212B. In further implementations, the attenuator 220 may be a component of the delay line 212B.

When the input signal crosses a low-threshold point, the comparator 214A-C triggers, signaling to the CDSC 216A-C that the detector 225 has received a pulse of light. At the same time, the signal passes through an analog delay line 212A-C. As the received pulse of light may be short (e.g., several nanoseconds), the analog delay line 212A-C provides sufficient time for the comparator 214A-C to trigger and release a signal to the CDSC 216A-C. However, although the comparator 214A-C acts near-instantaneously, the comparator 214A-C cannot be actually instantaneous. The nanoseconds that are lost by the activation of the comparator 214A-C may cause the CDSC 216A-C to miss most or all of the received signal.

For example, the CDSC 216A-C can receive a pulse at approximately t=0 ns with a pulse length of approximately 5 ns. The comparator 214A-C may take approximately 2.4 ns to trigger and instruct the CDSC 216A-C to begin measuring the signal. Without using the analog delay line 212A-C, the CDSC 216A-C will begin taking samples and/or measuring the signal at t=2.4 ns, whereas the pulse begins at t=0 ns and ends at t=5 ns. The voltage signal, then, may be near or at the peak of the wave when the first sample is taken. In embodiments in which the energy of the received light pulse 135 is determined by way of taking the difference of the first voltage sample and the second voltage sample, a delay of 2.4 ns may result in an incorrect energy measurement.

Depending on the implementation, the analog delay line may be a transmission line and/or may include a series of inductors and capacitors that act as a transmission line. In some implementations, the analog delay line 212A-C may delay the delivery of the voltage signal by approximately 1 ns, 3 ns, 5 ns, or any other suitable delay.

The CDSC 216A-C samples the voltage signal. In some embodiments, the CDSC 216A-C samples the voltage signal at least twice. In some implementations, the CDSC 216A-C takes the first sample after the comparator triggers, as described above. In such implementations, the first sample may represent the initial voltage of the signal. In further implementations, the second sample occurs at the peak of the signal. Depending on the implementation, the digital delay line 215 may trigger the CDSC 216A-C to collect the second sample. The digital delay line 215 may be a digital delay circuit with a programmable delay value that may be fixed to a particular value. The digital value may be set so the CDSC 216A-C takes the second sample of the voltage signal (208 or 235) at the peak of the signal. For example, the digital delay line may use a delay value of 10 ns, 17 ns, 24 ns, or any other suitable length of time between the first sample and the peak of the voltage signal.

After the CDSC 216A-C samples the signal, the CDSC 216A-C outputs an analog signal to an ADC 218A-C coupled to the output of the CDSC 216A-C. The ADC 218A-C then converts the analog signal to a digital signal. In some embodiments, a computing device (not pictured) and/or controller 150 then reads the output signal. In other embodiments, the ADC 218A-C is part of the computing device and/or controller 150. In such embodiments, the CDC 216A-C outputs the analog signal to the computing device and/or controller 150.

The lidar system 100 receives the output from the analog circuits 210A-C of the receiver 140. In some embodiments, the controller 150 of the lidar system 100 receives the output signals from the analog circuits 210A-C of the receiver 140 and, using the output signals, calculates the energy of the received pulse 135. In some implementations, the controller 150 calculates the pulse energy by calculating the difference between the second sample and the first sample. In further embodiments, the controller 150 calculates the reflectivity of the target object 130 using the energy of the received pulse 135. In still further embodiments, the controller 150 may calculate some other characteristic of the target (e.g., distance, material, shape, etc.) based on the energy of the received pulse 135 in addition or alternatively to the reflectivity of the target 130.

Figure 3:
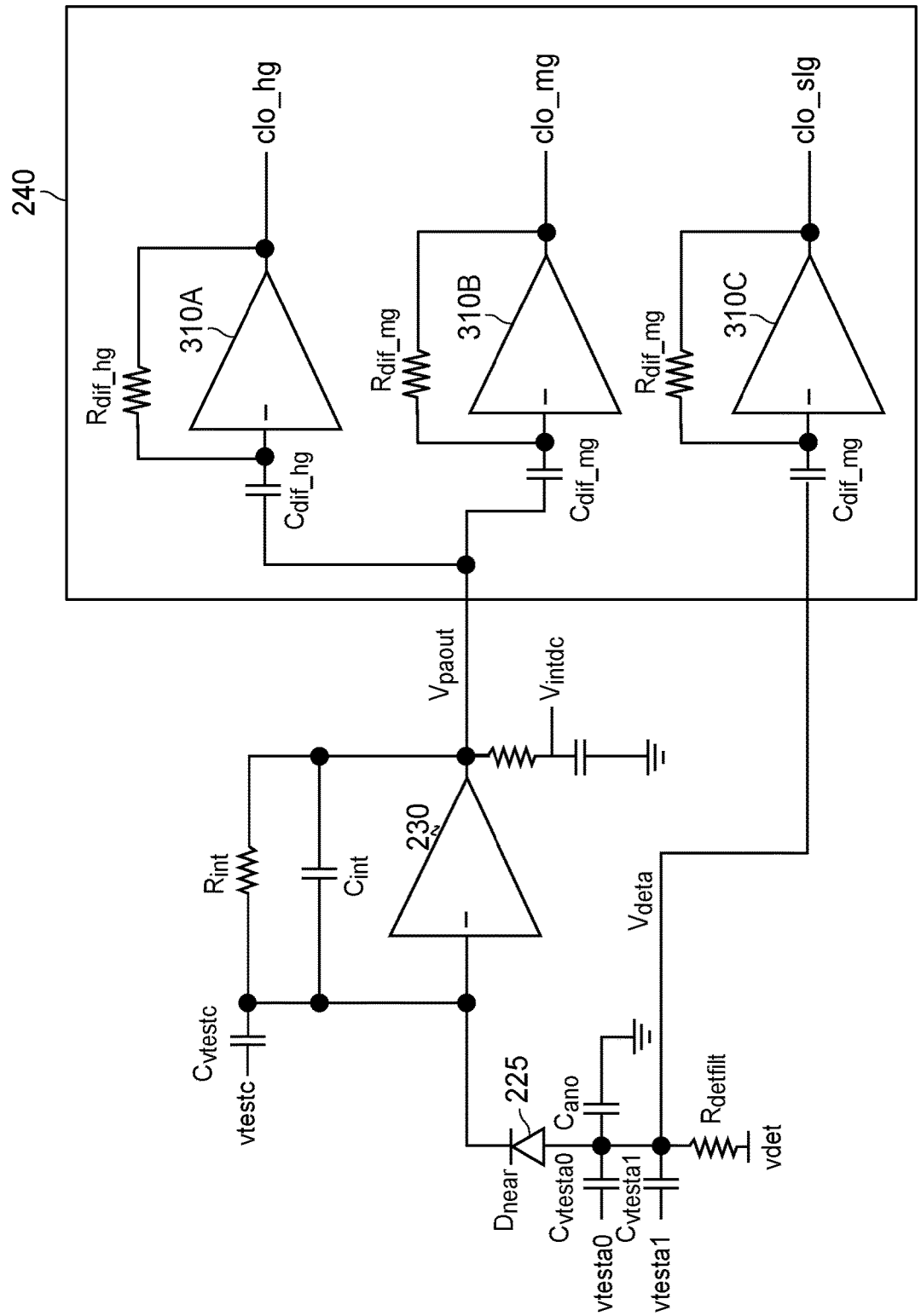
FIG. 3 illustrates a block diagram of an integrator and part of a pulse-detection circuit of an example receiver of a lidar system in which signal voltage is measured at either the output of an integrator or the anode of a detector.

Next, FIG. 3 illustrates an integrator 230 and a pulse-detection circuit 240. The integrator 230 and pulse-detection circuit 240 may be part of a receiver 140. In the example embodiment, the pulse-detection circuit may receive the signal voltage from the output of the integrator 230 and/or the anode of a detector 225. Further, the pulse-detection circuit 240 may include a number of gain differentiators 310. Although three gain differentiators 310A-C are shown in the exemplary embodiment of FIG. 3, any suitable number of differentiators may be used. In some embodiments, the gain differentiators 310A-C may differentiate the voltage signal from the integrator 230 and/or the anode of the detector 225 to produce a voltage pulse. In further embodiments, the gain differentiators 310A-C may differentiate the voltage signal from the cathode of the detector 225 in addition or alternatively to the anode of the detector 225. In some implementations, the gain differentiators differentiate the voltage into high gain, medium gain, and super-low gain signals at differentiators 310A, 310B, and 310C, respectively. In further implementations, the gain differentiators may differentiate the voltage signal into additional, fewer, and/or alternative categories. The pulse-detection circuit 240 may further include a series of comparators and time-to-digital converters coupled to the output of each gain differentiator 310A-C, as is discussed below with reference to FIG. 8.

Figure 4:
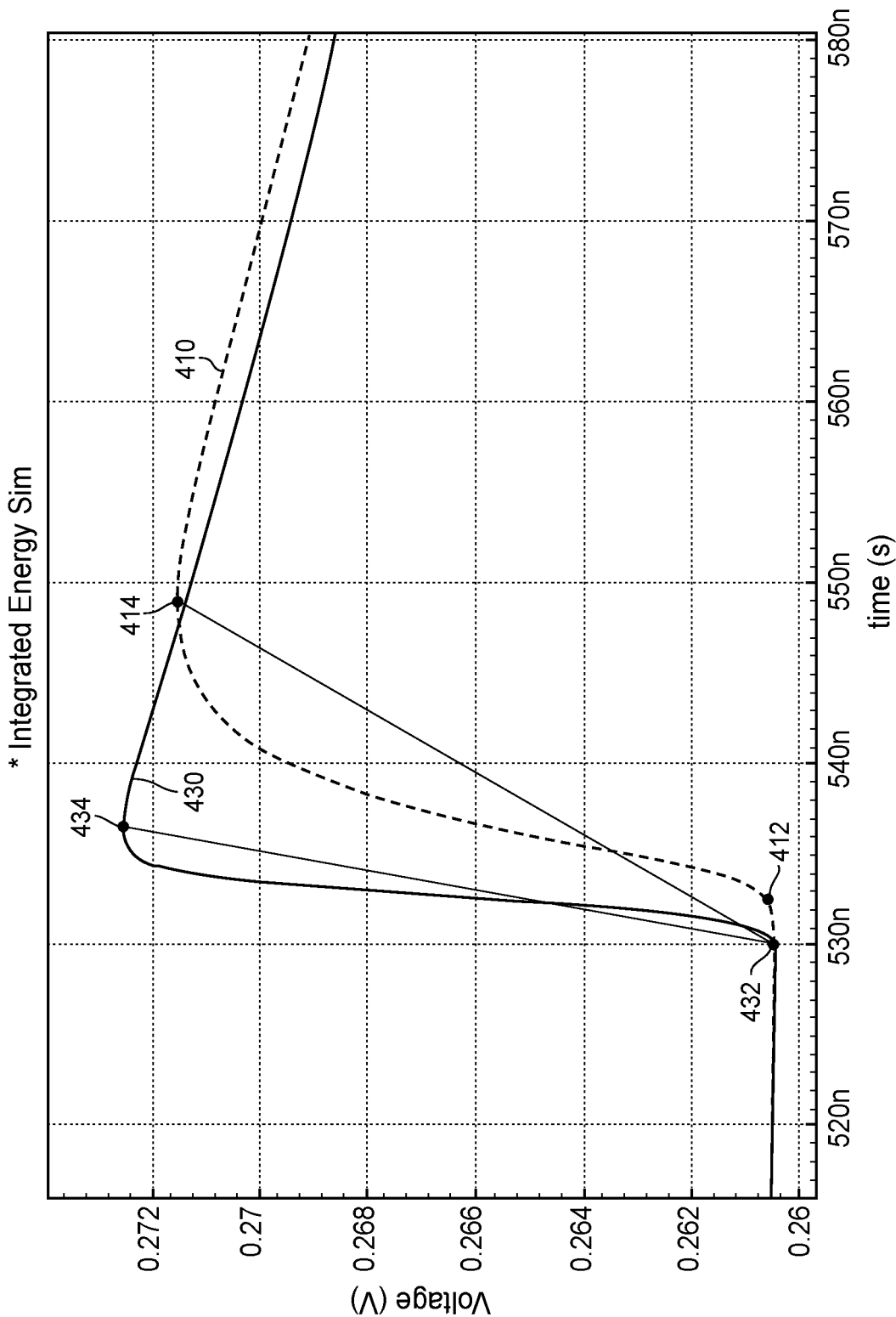
FIG. 4 illustrates an example plot of the measured pulse energy of a received light pulse, taken at the output of an integrator and at an analog circuit.

FIG. 4 illustrates an example plot of the measured pulse energy of a received light pulse at two separate points of the receiver 140. The curve 430 illustrates a voltage signal 208 or 235 at capacitor 206 or integrator 230, respectively, as a function of time, and represents the non-delayed voltage signal. The curve 410 measures voltage signal 208 or 235 after the signal travels through one of the analog delay lines 212A-C. As such, the curve 410 represents the delayed voltage signal.

Each curve 410 and 430 represents the change in voltage over time. In the exemplary embodiment of FIG. 4, the delayed curve 410 is approximately 3 ns behind the raw curve 430 due to the analog delay line 212A-C the signal passes through for the delayed curve. Because the comparator 214A-C (illustrated in FIG. 2) can cause a nanoseconds-long delay, the delay allows for accurate measurement of the signal in the analog circuit 210A-C. Without a delay, the analog circuit 210A-C may miss some to all of the pulse rise before measurement begins, potentially altering the final measurement.

The analog circuit 210A-C measures the voltage at points 412 and 414 on curve 410, which represent the initial and peak voltages, respectively. The pulse energy corresponds to the difference between the voltages corresponding to points 412 and 414. In some embodiments, the voltage amplitude on the raw curve 430 is larger than the delayed curve. The difference in amplitude between curves 410 and 430 may be due to signal loss or attenuation along the delay line. In some implementations, a computing device (not pictured) and/or the controller 150 of the lidar system 100 may apply a scaling factor to compensate for the signal loss. In further implementations, the signal loss may be within reasonable bounds and is not compensated for.

Figure 5A:
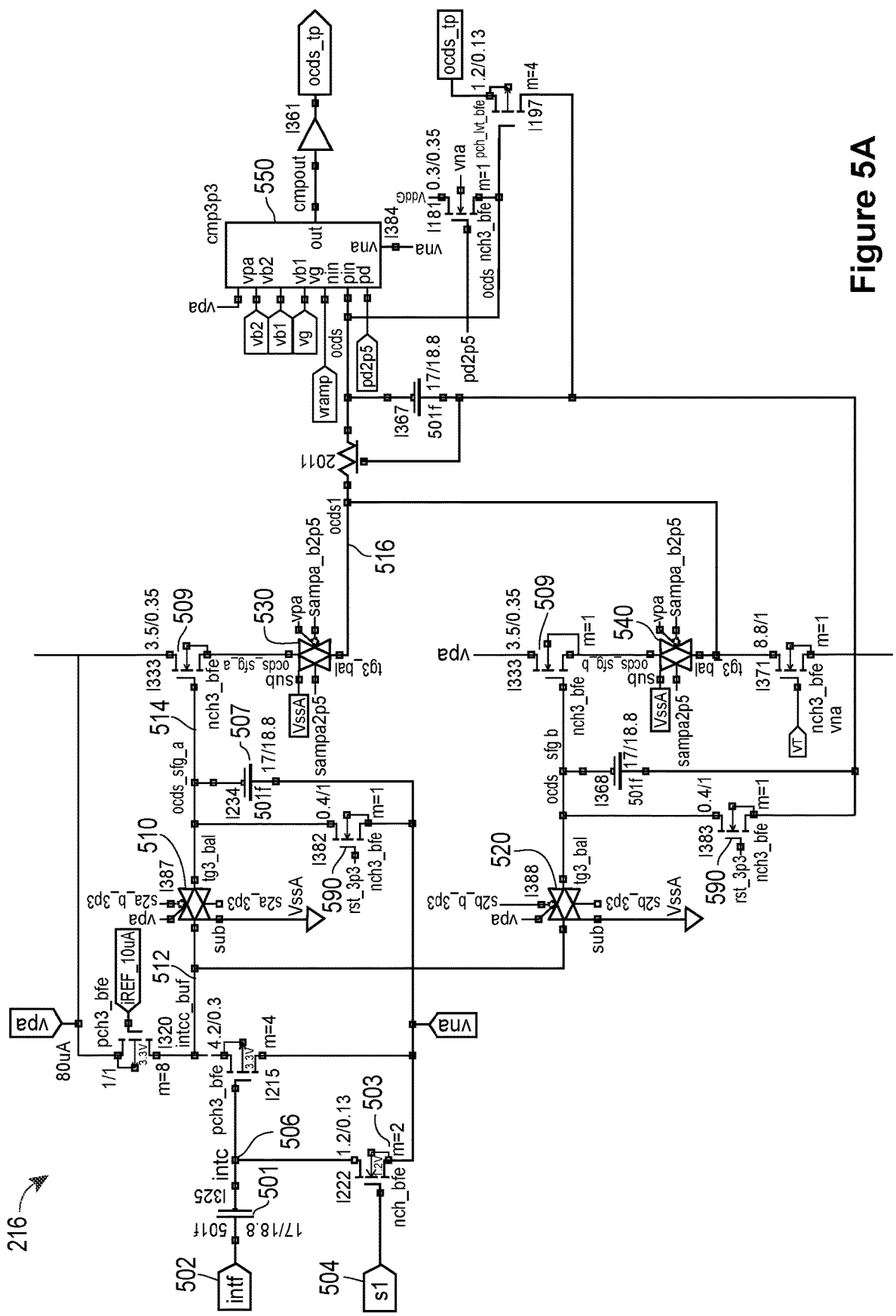
FIG. 5A illustrates an example circuit diagram of a correlated double-sampling circuit used to measure the difference between two voltage samples.
Figure 5B:
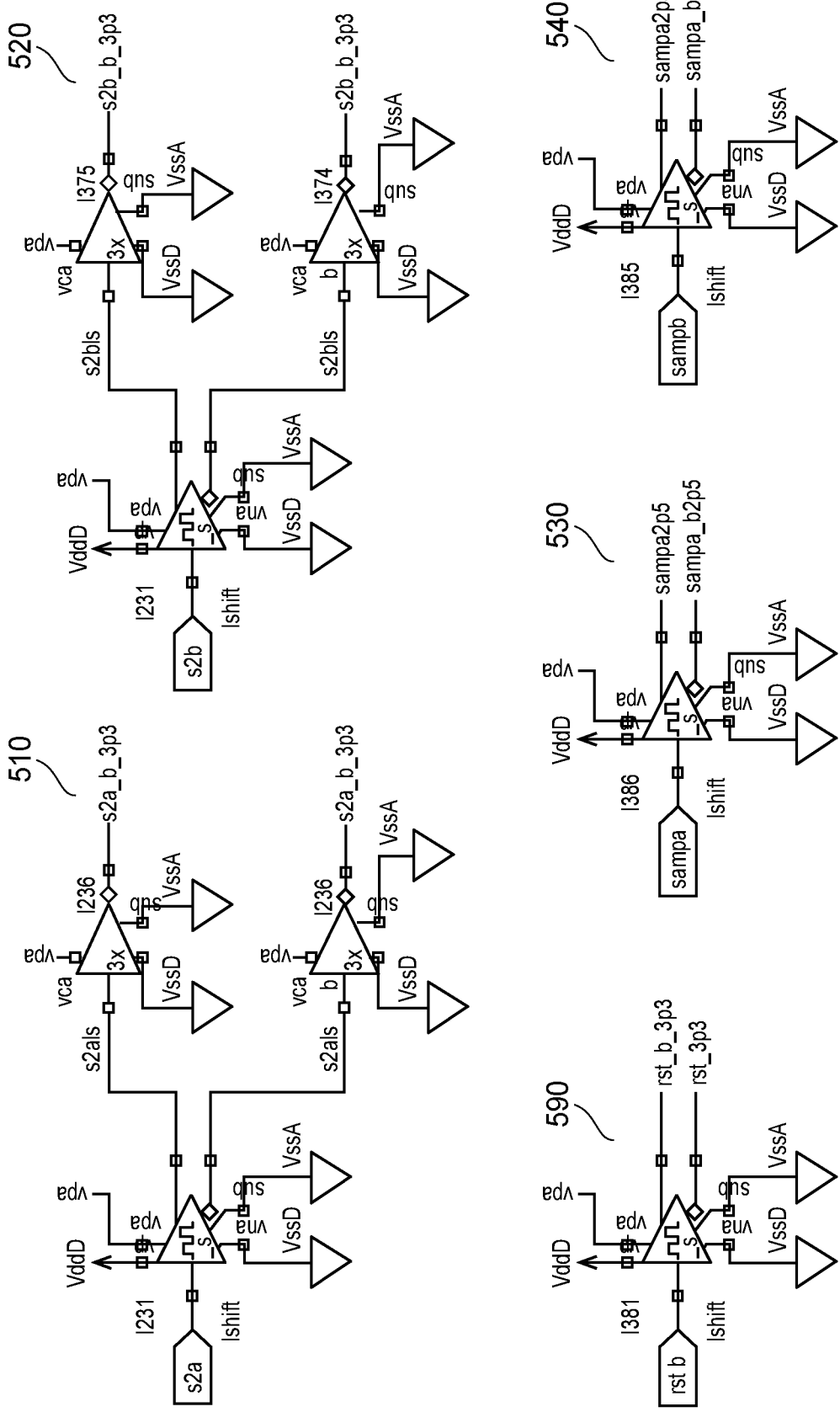
FIG. 5B illustrates an example circuit diagram of various switches in the correlated double-sampling circuit of FIG. 5A.

FIGS. 5A and 5B illustrate example circuit diagrams of a correlated double-sampling circuit (CDSC) used to measure the difference between two voltage samples and detailed views of particular portions of the CDSC. In some embodiments, the CDSC includes at least four circuit elements connected to switches (510, 520, 530, and 540), a manual reset 590, and a comparator 550. In further embodiments, the CDSC includes two paths, allowing the CDSC to read one signal while measuring the other signal, allowing for a faster throughput rate. In still further embodiments, the switches connected to circuit elements 510 and 520 are initially closed.

In some embodiments, the delay line 212 is coupled to input 502 of the CDSC 216. In some implementations, the CDSC 216 samples the baseline voltage of the signal a first time when the voltage at 504 drops beyond a low threshold, causing the switch 503 to open. While switch 503 is closed, the voltage at 506 is zero, the voltage at 512 and 514 are equal to the voltage at switch 505, and the voltage across capacitor 501 is equal to the baseline voltage. When the switch opens, the voltage across capacitor 501 does not change. When the signal changes by an amount $V_{sig}$, the voltage at 512 and 514 increases by $V_{sig}$. When the voltage change reaches a peak, the circuit component 510 and/or 520 opens, capturing the voltage on capacitor 507 (i.e., $V_{sig} + V_{503}$).

In some embodiments, the CDSC 216 reads the voltage stored on capacitor 507 when switch 530 closes. In some implementations, the closing of switch 530 causes current to flow in the source follower 509. Depending on the implementation, the source follower 509 may act as a buffer to drive the comparator 550 with the voltage at node 516. The CDSC 216 may drive the other input of the comparator 550 with a voltage ramp waveform. When the voltage ramp waveform reaches the voltage at node 516, the comparator 550 may emit an output pulse. In some embodiments, the pulse provides timing information used to capture a code of a high-speed Gray code counter into SRAM. In some implementations, the lidar system 100 uses the code as a digital representation of the voltage.

In the exemplary embodiment of FIG. 5A, the CDSC 216A-C includes two paths. In some embodiments, the second path is designed similarly to the first path and is coupled to the same inputs as the first path. In further embodiments, the second path differs from the first path and/or is coupled to a separate input from the first path. Referring back to FIG. 2, in some embodiments, the receiver 140 uses the same CDSC 216 for each of the analog circuits 210A-C. In further embodiments, the CDSC 216 includes at least one path for each analog circuit 210. In still further embodiments, each analog circuit 210 includes a separate CDSC 216A-C with at least one path each.

FIG. 5B depicts a series of expanded views of circuit elements 510, 520, 530, 540, and 590 of FIG. 5A. In some embodiments, circuit elements 510, 520, 530, 540, and 590 are connected to switches. In some implementations, the switches connected to circuit elements 510, 520, 530, 540, and/or 590 trigger in response to an indication that a voltage sample is to be taken. In further embodiments, circuit elements 510, 520, 530, and 540 may include one or more level shifters and output the voltage sample. The level shifters may be digital circuits that translate 1.2V logic levels to 2.5V logic levels. The level shifters may output two output signals: the logic signal and the complement of the logic signal. In some implementations, each of the outputs of the level shifters of circuit elements 510 and 520 is coupled to an inverter. The inverter may provide more drive strength for controlling the switches. Depending on the implementation, circuit elements 530 and 540 and/or level shifters coupled to circuit elements 530 and 540 may be coupled to inverters in addition to or instead of circuit elements 510 and 520. In some embodiments, circuit element 590 functions as a reset switch and short circuits the rest of CDSC when activated.

Figure 6:
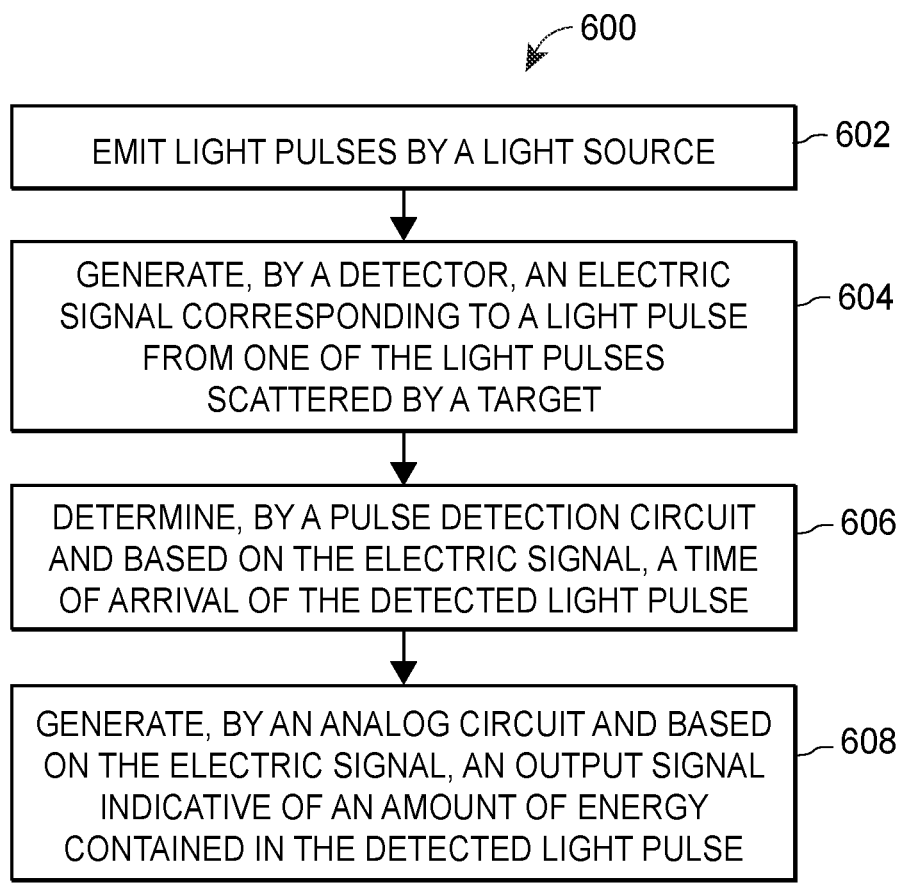
FIG. 6 is a flow diagram of an example method for measuring the pulse energy of a light pulse, which can be implemented using the analog circuit of FIG. 2.

FIG. 6 illustrates a flow diagram of an example method 600 for measuring the pulse energy of a light pulse. In some embodiments, the method is implemented using the analog circuits 210 in receiver 140 of FIG. 2.

At block 602, the lidar system emits light pulses via a light source. At block 604, a detector 225 generates an electric signal corresponding to a light pulse from one of the light pulses scattered by a target. At block 606, a pulse detection circuit 240 determines, based on the electric signal, a time of arrival of the detected light pulse. At block 608, an analog circuit 210 generates, based on the electric signal, an output signal indicative of an amount of energy contained in the detected light pulse.

At block 602, the lidar system 100 emits light pulses via a light source 110. In some embodiments, the light source 110 may be a laser which emits light having a particular operating wavelength. The operating wavelength of a lidar system 100 may lie, for example, in the infrared, visible, or ultraviolet portions of the electromagnetic spectrum. The light source 110 emits light 125 toward a target which then scatters the light 135. Some of the scattered light 135 is received back at the receiver 140. In some embodiments, the lidar system 100 emits light pulses across a field of regard by way of a scanner coupled to the light source 110.

At block 604, the detector 225 generates an electric signal corresponding to a light pulse from one of the light pulses scattered by a target. In some embodiments, the detector 225 may be an avalanche photodiode detector (APD). Depending on the implementation, the APD may be made of silicon, germanium, indium-gallium-arsenide (InGaAs), gallium-nitride (GaN), mercury-cadmium-telluride (HgCdTe), or any other semiconductor material suitable for an APD.

In some embodiments, the electric signal generated by the detector 225 may be a current signal. In some implementations, an integrator 230 may receive the current signal from the output of the detector. The integrator 230 may then convert the current signal to a voltage signal. In further implementations, the integrator 230 may convert the current signal by way of a capacitor and according to the equation $$V = V_0 + \frac{1}{C} \cdot \int (I \cdot dt).$$

The voltage signal, then, is proportional to the energy of the signal E=∫(P·dt), where P is the signal power which is integrated over the time duration of the pulse. In some embodiments, the integrator 230 may additionally or alternatively act as an amplifier.

In further embodiments, the electric signal may be a voltage signal on the anode and/or cathode of the detector. In some implementations, one or more analog circuits may receive the voltage signal directly at an input.

At block 606, the pulse detection circuit (PDC) 240 determines, based on the electric signal, the time of arrival of the detected light pulse 135. In some embodiments, the PDC 240 may receive the electric signal from an integrator coupled to the detector. In further embodiments, the PDC 240 may receive the electric signal from the anode or the cathode of the detector 225. After receiving the electric signal, the PDC 240 may process the signal and output an output signal. In some embodiments, the PDC 240 transmits the output signal to a controller 150 and/or computing device (not shown). In further embodiments, the PDC 240 additionally or alternatively transmits the output signal to a correlated double sampling circuit 216 through a digital delay line 215.

At block 608, the analog circuit 210 generates an output signal indicative of an amount of energy contained in the detected light pulse 135. In some embodiments, the analog circuit 210 may generate the output signal based on the electric signal. In some implementations, the analog circuit 210 may generate the output signal by receiving a voltage signal at an input to a correlated double-sampling circuit (CDSC) 216. In further implementations, the analog circuit 210 may sample the voltage twice, once in response to a first trigger signal from a comparator 214 in the analog circuit and a second time in response to a second trigger signal from a digital delay line 215 in the CDSC 216. Depending on the implementation, the digital delay line 215 may be a timing circuit, similar to the PDC 240. In further implementations, the digital delay line 215 may be the PDC 240. In some embodiments, the analog circuit 210 and/or the CDSC 216 may then determine a difference between voltage samples of the voltage signal. In further embodiments, the difference between voltage samples may be indicative of the amount of energy in the detected light pulse 135.

Depending on the embodiment, the analog circuit 210 may reduce the voltage signal by way of an attenuator 220 before the CDSC 216 receives the signal. In some embodiments, the analog circuit 210 may receive the output signal from the CDSC 216 at an analog-to-digital converter (ADC) 218. In some implementations, the ADC 218 generates a digital value indicative of the amount of energy in the detected light pulse 135.

In some embodiments, the receiver 140 may include a plurality of analog circuits 210. In some implementations of such embodiments, each analog circuit 210 may process signals with different gains. In an exemplary embodiment, a first analog circuit 210C may process signals with a high gain (HG), a second analog circuit 210A may process signals with a low or super-low gain (LG or SLG), and a third analog circuit 210B may process ultra-low-gain signals (ULG).

In some embodiments, method 600 may further include generating a pixel based on the time of arrival of the detected light pulse 135 and/or an indication of the target 130 based on the output signal from the analog circuit 210. In some implementations, the reflectivity of a target 130 may be calculated based on the expression $$R = \frac{E_r}{E_t} \cdot f(D),$$

where R is the reflectivity, $E_r$ is the energy of the received light pulse, $E_t$ is the energy of the emitted light pulse, and $f(D)$ is a scaling function that depends on the distance D to the target 130.

In further embodiments, the lidar system 100 may determine the energy of each emitted pulse of light 125 without directly measuring the energy (e.g., the light source may not exhibit much pulse-to-pulse energy variation). In other cases, the energy of the pulses of light may vary unpredictably from pulse to pulse, and so the lidar system 100 may use the analog circuit 210 to determine the energy of each emitted pulse 125 (in addition to measuring the energy of received pulses of light 135). For example, the lidar system 100 may direct a small portion of each emitted pulse of light 125 (e.g., 1%) to the receiver 140 to measure the energy.

Figure 7:
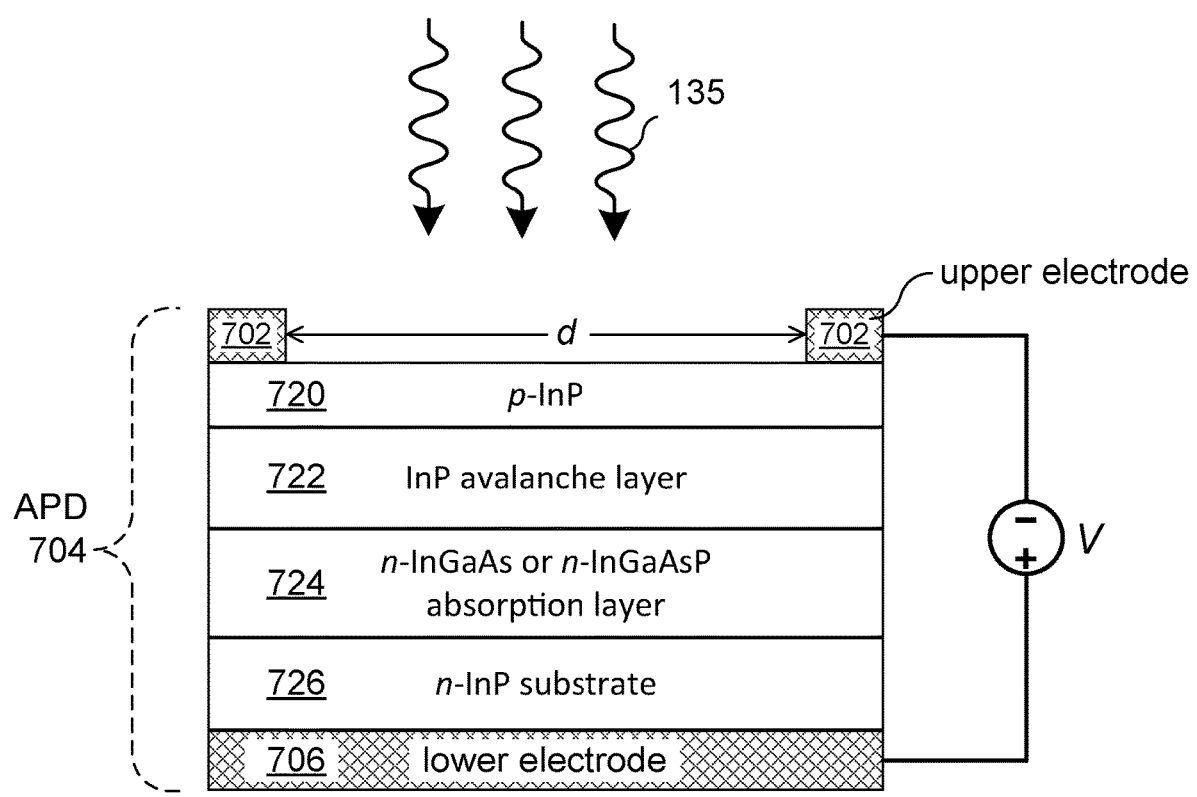
FIG. 7 illustrates an example avalanche photodiode (APD), which can operate as a light detector element of a receiver.

FIG. 7 illustrates an example InGaAs avalanche photodiode detector (APD) 700. Referring back to FIG. 1, the receiver 140 may include one or more APDs 700 configured to receive and detect light from an input light such as a beam 135. More generally, the APD 704 can operate in any suitable receiver of input light. The APD 704 may detect a portion of pulses of light which are scattered by a target located downrange from the lidar system in which the APD 704 operates. For example, the APD 704 may receive a portion of a pulse of light scattered by the target 130 depicted in FIG. 1 and generate an electrical-current signal corresponding to the received pulse of light.

The APD 704 may include doped or undoped layers of any suitable semiconductor material such as, for example, silicon, germanium, InGaAs, InGaAsP, or indium phosphide (InP). Additionally, the APD 704 may include an upper electrode 702 and a lower electrode 706 for coupling the APD 704 to an electrical circuit. The APD 704, for example, may be electrically coupled to a voltage source that supplies a reverse-bias voltage V to the APD 704. Additionally, the APD 704 may be electrically coupled to a transimpedance amplifier which receives electrical current generated by the APD 704 and produces an output voltage signal that corresponds to the received current. The upper electrode 702 or lower electrode 706 may include any suitable electrically conductive material, such as, for example, a metal (e.g., gold, copper, silver, or aluminum), a transparent conductive oxide (e.g., indium tin oxide), a carbon-nanotube material, or polysilicon. In some implementations, the upper electrode 702 is partially transparent or has an opening to allow input light 135 to pass through to the active region of the APD 704. In FIG. 7, the upper electrode 702 may have a ring shape that at least partially surrounds the active region of the APD 704, where the active region refers to an area over which the APD 704 may receive and detect the input light 710. The active region may have any suitable size or diameter d, such as, for example, a diameter of approximately 25 µm, 50 µm, 80 µm, 100 µm, 200 µm, 500 µm, 1 mm, 2 mm, or 5 mm.

The APD 704 may include any suitable combination of any suitable semiconductor layers having any suitable doping (e.g., n-doped, p-doped, or intrinsic undoped material). In the exemplary embodiment of FIG. 7, the InGaAs APD 400 includes a p-doped InP layer 720, an InP avalanche layer 722, an absorption layer 724 with n-doped InGaAs or InGaAsP, and an n-doped InP substrated layer 726. Depending on the implementation, the APD 704 may include separate absorption and avalanche layers, or a single layer may act as both an absorption and avalanche region. The APD 704 may operate electrically as a PN diode or a PIN diode, and, during operation, the APD 704 may be reverse-biased with a positive voltage V applied to the lower electrode 706 with respect to the upper electrode 702. The applied reverse-bias voltage V may have any suitable value, such as, for example, approximately 5 V, 10 V, 20 V, 30 V, 50 V, 75 V, 100 V, or 200 V.

In FIG. 7, photons of the input light 135 may be absorbed primarily in the absorption layer 724, resulting in the generation of electron-hole pairs (which may be referred to as photo-generated carriers). For example, the absorption layer 724 may absorb photons corresponding to the operating wavelength of the lidar system 100 (e.g., any suitable wavelength between approximately 1400 nm and approximately 1600 nm). In the avalanche layer 722, an avalanche-multiplication process occurs where carriers (e.g., electrons or holds) generated in the absorption layer 724 collide with the semiconductor lattice of the absorption layer 724, and produce additional carriers through impact ionization. The avalanche process can repeat numerous times so that one photo-generated carrier may result in the generation of multiple carriers. As an example, a single photon absorbed in the absorption layer 724 may lead to the generation of approximately 10, 50, 100, 200, 500, 1000, 10000, or any other suitable number of carriers through an avalanche-multiplication process. The carriers generated in an APD 704 may produce an electrical current that is coupled to an electrical circuit which may perform, for example, signal amplification, sampling, filtering, signal conditioning, analog-to-digital conversion, time-to-digital conversion, pulse detection, threshold detection, rising-edge detection, or falling-edge detection.

The number of carriers generated from a single photo-generated carrier may increase as the applied reverse bias V increases. If the applied reverse bias V increases above a particular value—referred to as the APD breakdown voltage—then a single carrier can trigger a self-sustaining avalanche process (e.g., the output of the APD 704 is saturated regardless of the input light level). The APD 704 operating at or above a breakdown voltage may be referred to as a single-photon avalanche diode (SPAD) and may be referred to as operating in a Geiger mode or a photon-counting mode. The APD 704 operating below a breakdown voltage may be referred to as a linear APD, and the APD 704 may send the generated output current to an amplifier circuit (e.g., a transimpedance amplifier). The receiver 140 may include an APD operating as a SPAD and a quenching circuit configured to reduce a reverse-bias voltage applied to the SPAD when an avalanche event occurs in the SPAD. The APD 704 operating as a SPAD may be coupled to an electronic quenching circuit that reduces the applied voltage V below the breakdown voltage when an avalanche-detection event occurs. Reducing the applied voltage may halt the avalanche process, and the applied reverse-bias voltage may then be reset to await a subsequent avalanche event. Additionally, the APD 704 may be coupled to a circuit that generates an electrical output pulse or edge when an avalanche event occurs.

In some implementations, the APD 704 or the APD 704 along with transimpedance amplifier have a noise-equivalent power (NEP) that is less than or equal to 100 photons, 50 photons, 30 photons, 20 photons, or 10 photons. For example, the APD 704 may operate as a SPAD and may have an NEP of less than or equal to 20 photons. As another example, the APD 704 may be coupled to a transimpedance amplifier that produces an output voltage signal with an NEP of less than or equal to 50 photons. The NEP of the APD 704 is a metric that quantifies the sensitivity of the APD 704 in terms of a minimum signal (or a minimum number of photons) that the APD 704 can detect. The NEP may correspond to an optical power (or to a number of photons) that results in a signal-to-noise ratio of 1, or the NEP may represent a threshold number of photons above which the APD 704 may detect an optical signal. For example, if the APD 704 has an NEP of 20 photons, then the APD 704 may detect the input beam 135 with 20 photons as having a signal-to-noise ratio of approximately 1 (e.g., the APD 704 may receive 20 photons from the input beam 135 and generate an electrical signal representing the input beam 135 that has a signal-to-noise ratio of approximately 1). Similarly, the APD 704 may detect the input beam 135 with 100 photons as having a signal-to-noise ratio of approximately 5. In some implementations, the lidar system 100 with the APD 704 (or a combination of the APD 704 and transimpedance amplifier) having an NEP of less than or equal to 100 photons, 50 photons, 30 photons, 20 photons, or 10 photons offers improved detection sensitivity with respect to a conventional lidar system that uses a PN or PIN photodiode. For example, an InGaAs PIN photodiode used in a conventional lidar system may have an NEP of approximately $10^4$ to $10^5$ photons, and the noise level in a lidar system with an InGaAs PIN photodiode may be $10^3$ to $10^4$ times greater than the noise level in a lidar system 100 with the InGaAs APD detector 700.

Referring back to FIG. 1, an optical filter may be located in front of the receiver 140 and may transmit light at one or more operating wavelengths of the light source 110. In some embodiments, the optical filter may attenuate light at surrounding wavelengths. For example, an optical filter may be a free-space spectral filter located in front of APD 704 of FIG. 7. The spectral filter may transmit light at the operating wavelength of the light source 110 (e.g., between approximately 1530 nm and 1560 nm) and attenuate light outside that wavelength ranger. As a more specific example, light with wavelengths of approximately 400-1530 nm or 1560-2000 nm may be attenuated by any suitable amount, such as, for example, by at least 5 dB, 10 dB, 20 dB, 30 dB, or 40 dB.

Figure 8:
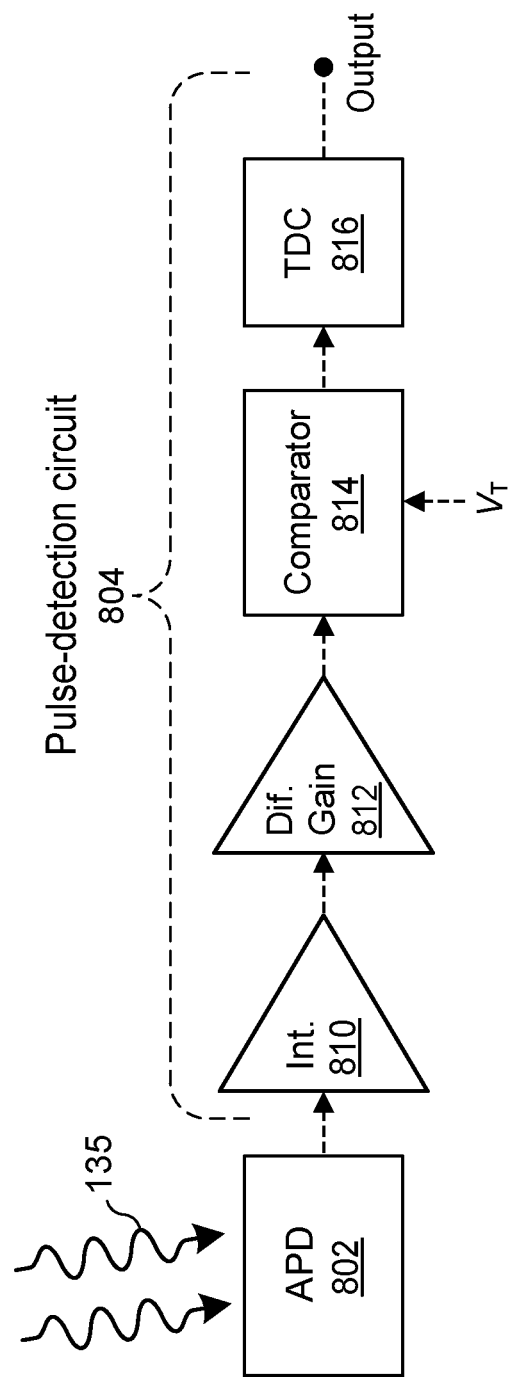
FIG. 8 illustrates an example pulse-detection circuit, which can be used to determine the timing and distance traveled of reflected light pulses.

Next, FIG. 8 illustrates an APD 802 coupled to an example pulse-detection circuit 804. The APD 802 can be similar to the APD 704 discussed above with reference to FIG. 7, or can be any other suitable detector. The pulse-detection circuit 804 can operate in the lidar system of FIG. 1 as part of the receiver 140. Further, the pulse-detection circuit 804 can operate as the pulse-detection circuit 240 in FIG. 2. The pulse-detection circuit 804 alternatively can be implemented in the controller 150 or another suitable controller. In some implementations, parts of the pulse-detection circuit 804 can operate in a receiver and other parts of the pulse-detection circuit 804 can operate in a controller. For example, components 810 and 812 may be a part of the receiver 140, and components 814 and 816 may be a part of the controller 150.

The pulse-detection circuit 804 may include circuitry that receives a signal from a detector (e.g., an electrical current from the APD 802) and performs current-to-voltage conversion, signal amplification, sampling, filtering, signal conditioning, analog-to-digital conversion, time-to-digital conversion, pulse detection, threshold detection, rising-edge detection, or falling-edge detection, as examples. The pulse-detection circuit 804 may determine whether the APD 802 has received an optical pulse or may determine a time associated with receipt of an optical pulse by the APD 802. Additionally, the pulse-detection circuit 804 may determine a duration of a received optical pulse. In an example implementation, the pulse-detection circuit 804 includes an integrator 810, a gain differentiating circuit 812, a comparator 814, and a time-to-digital converter (TDC) 816.

The integrator 810 may receive an electrical-current signal from the APD 802 and produce a voltage signal that corresponds to the received electrical-current signal. For example, in response to a received optical pulse, the APD 802 may produce a current pulse corresponding to the optical pulse. The integrator 810 may receive the current pulse from the APD 802 and produce a voltage pulse that corresponds to the received current pulse. The integrator 810 may also act as an electronic filter. For example, the integrator 810 may act as a low-pass filter that removes or attenuates high-frequency electrical noise by attenuating signals above a particular frequency (e.g., above 1 MHz, 10 MHz, 20 MHz, 50 MHz, 100 MHz, 200 MHz, or any other suitable frequency).

The gain differentiator circuit 812 may amplify a voltage signal. As an example, the gain differentiator circuit 812 may include one or more voltage-amplification stages that amplify a voltage signal received from the integrator 810. For example, the gain differentiator circuit 812 may receive a voltage pulse from the integrator 810 and the gain differentiator circuit 812 may amplify the voltage pulse by any suitable amount, such as, for example, by a gain of approximately 3 dB, 10 dB, 20 dB, 30 dB, 40 dB, or 50 dB. Additionally, the gain differentiator circuit 812 may also act as an electronic filter configured to remove or attenuate electrical noise.

The comparator 814 may receive a voltage signal from the integrator 810 or the gain differentiator circuit 812 and produce an electrical-edge signal (e.g., a rising edge or a falling edge) when the received voltage signal rises above or falls below a particular threshold voltage $V_T$. As an example, when a received voltage rises above $V_T$, the comparator 814 may produce a rising-edge digital-voltage signal (e.g., a signal that steps from approximately 0 V to approximately 2.5 V, 3.3 V, 5 V, or any other suitable digital-high level). As another example, when a received voltage falls below $V_T$, the comparator 814 may produce a falling-edge digital voltage signal (e.g., a signal that steps down from approximately 2.5 V, 3.3 V, 5 V, or any other suitable digital-high level to approximately 0 V). The comparator 814 may receive the voltage signal from the integrator 810 or the gain differentiator circuit 812. In some embodiments, the voltage signal may correspond to an electrical-current signal generated by the APD 802. For example, the voltage signal received by the comparator 814 may include a voltage pulse that corresponds to an electrical-current pulse produced by the APD 802 in response to receiving an optical pulse. The voltage signal received by the comparator 814 may be an analog signal, and an electrical-edge signal produced by the comparator 814 may be a digital signal.

The time-to-digital converter (TDC) 816 may receive an electrical-edge signal from the comparator 814 and determine an interval of time between emission of a pulse of light by the light source and receipt of the electrical-edge signal. The output of the TDC 816 may be a numerical value that corresponds to the time interval determined by the TDC 816. In some implementations, the TDC 816 has an internal counter or clock with any suitable period, such as, for example, 5 ps, 10 ps, 15 ps, 20 ps, 30 ps, 50 ps, 100 ps, 0.5 ns, 1 ns, 2 ns, 5 ns, or 10 ns. The TDC 816, for example, may have an internal counter or clock with a 20 ps period, and the TDC 816 may determine that an interval of time between emission and receipt of a pulse is equal to 25000 time periods, which corresponds to a time interval of approximately 0.5 microseconds. Referring back to FIG. 1, the TDC 816 may send the numerical value "25000" to a processor or controller 150 of the lidar system 100, which may include a processor configured to determine a distance from the lidar system 100 to the target 130 based at least in part on an interval of time determined by a TDC 816. The processor may receive a numerical value (e.g., "25000") from the TDC 816 and, based on the received value, the processor may determine the distance from the lidar system 100 to a target 130.

Figure 9:
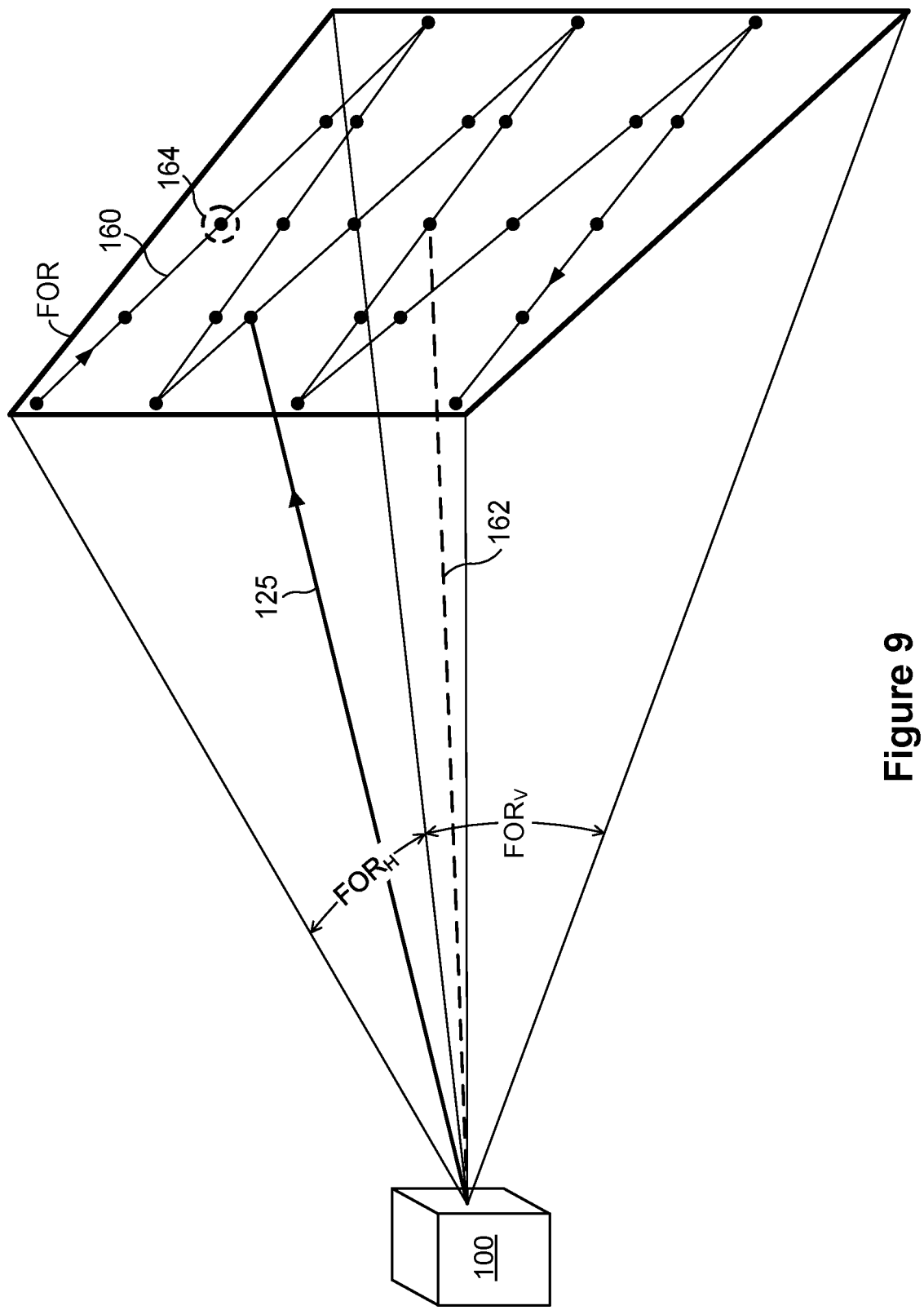
FIG. 9 illustrates an example scan pattern which the lidar system of FIG. 1 can produce when identifying targets within a field of regard.

FIG. 9 illustrates an example scan pattern 160 which the lidar system 100 of FIG. 1 can produce. The lidar system 100 may be configured to scan output optical beam 125 along one or more scan patterns 240. In some implementations, the scan pattern 240 corresponds to a scan across any suitable filed of regard (FOR) having any suitable horizontal FOR ($FOR_H$) and any suitable vertical FOR ($FOR_V$). For example, a certain scan pattern may have a field of regard represented by angular dimensions (e.g., $FOR_H \times FOR_V$) 40°×30°, 90°×40°, or 60°×15°. As another example, a certain scan pattern may have a $FOR_H$ greater than or equal to 10°, 25°, 30°, 40°, 60°, 90°, or 120°. As yet another example, a certain scan pattern may have a $FOR_V$ greater than or equal to 2°, 5°, 10°, 15°, 20°, 30°, or 45°. In the exemplary embodiment of FIG. 9, a reference line 162 represents a center of the field of regard of scan pattern 160. The reference line 162 may have any suitable orientation, such as a horizontal angle of 0° (e.g., reference line 162 may be oriented straight ahead) and a vertical angle of 0° (e.g., a reference line 162 may have an inclination of 0°), or the reference line 162 may have a nonzero horizontal angle or a nonzero inclination (e.g., a vertical angle of +10° or −10°). In FIG. 9, if the scan pattern 160 has a 60°×15° field of regard, then the scan pattern 160 covers a ±30° horizontal range with respect to reference line 162 and a ±7.5° vertical range with respect to reference line 162. Additionally, the optical beam 125 in FIG. 9 has an orientation of approximately −15° and an altitude of +3° relative to the reference line 162. An azimuth (which may be referred to as an azimuth angle) may represent a horizontal angle with respect to the reference line 162, and an altitude (which may be referred to as an altitude angle, elevation, or elevation angle) may represent a vertical angle with respect to the reference line 162.

The scan pattern 160 may include multiple pixels 164, and each pixel 164 may be associated with one or more laser pulses and one or more corresponding distance measurements. A cycle of scan pattern 160 may include a total of $P_x \times P_y$ pixels 164 (e.g., a two-dimensional distribution of $P_x$ by $P_y$ pixels). For example, the scan pattern 160 may include a distribution with dimensions of approximately 100-2000 pixels along a horizontal direction and approximately 4-400 pixels along a vertical direction. As another example, the scan pattern 160 may include a distribution of 1000 pixels along the horizontal direction by 64 pixels along the vertical direction (e.g., the frame size is 1000×64 pixels) for a total of 64000 pixels per cycle of scan pattern 160. The number of pixels 164 along a horizontal direction may be referred to as horizontal resolution of the scan pattern 160, and the number of pixels 164 along a vertical direction may be referred to as a vertical resolution of the scan pattern 160. As an example, the scan pattern 160 may have a horizontal resolution of greater than or equal to 100 pixels and a vertical resolution of greater than or equal to 4 pixels. As another example, the scan pattern 160 may have a horizontal resolution of 100-2000 pixels and a vertical resolution of 4-400 pixels.

Each pixel 164 may be associated with a distance (e.g., a distance to a portion of a target 130 from which the corresponding laser pulse was scattered) or one or more angular values. As an example, the pixel 164 may be associated with a distance value and two angular values (e.g., an azimuth and altitude) that represent the angular location of the pixel 164 with respect to the lidar system 100.

The lidar system 100 may determine a distance to a portion of the target 130 based at least in part on a time-of-flight measurement for a corresponding pulse. An angular value (e.g., an azimuth or altitude) may correspond to an angle (e.g., relative to reference line 162) of the output beam 125 (e.g., when a corresponding pulse is emitted from lidar system 100) or an angle of the input beam 135 (e.g., when an input signal is received by lidar system 100). In some implementations, the lidar system 100 determines an angular value based at least in part on a position of a component of the scanner 120. For example, the lidar system 100 may determine an azimuth or altitude value associated with the pixel 164 from an angular position of one or more corresponding scanning mirrors of the scanner 120.

The FOR illustrated in FIG. 9, which extends laterally in two dimensions (e.g., horizontal and vertical), may be referred to as a two-dimensional field of regard. In some embodiments, a FOR may include, may be part of, or may be referred to as a three-dimensional field of regard that also extends along a third dimension (e.g., axially). As an example, a lidar system 100 may use a three-dimensional FOR in a range-gating application where a lidar system 100 operates over a particular distance range (e.g. from 50 m to 100 m from the lidar system). In some embodiments, a two-dimensional field of regard may be part of or may be configured as a three-dimensional field of regard. For example, a two-dimensional field of regard may be configured as a three-dimensional field of regard with the addition of a distance parameter that represents a distance range from the lidar system 100. As an example, a two-dimensional field of regard that covers the angular range 100°×20° may be configured as a three-dimensional field of regard with the addition of the distance parameter 50-100 meters.

According to a first aspect, a lidar system includes a light source configured to emit light pulses and a receiver configured to receive light pulses from some of the light pulses scattered by one or more targets. The receiver includes a detector configured to detect a light pulse and output an electric signal corresponding to the detected light pulse; a pulse-detection circuit configured to determine, based on the electric signal, a time of arrival of the detected light pulse; and an analog circuit configured to generate, based on the electrical signal, an output signal indicative of an amount of energy contained in the detected light pulse.

According to a second aspect, the analog circuit of the first aspect includes a correlated double-sampling (CDS) circuit component having an input configured to receive a voltage signal, the CDS circuit component configured to determine a difference between voltage samples, wherein the difference is indicative of the amount of energy in the detected light pulse.

According to a third aspect, the analog circuit of the second aspect includes a comparator coupled to the input of the analog circuit and set to a baseline value, to provide a first trigger signal to the CDS circuit component, to cause the CDS to generate a first one of the voltage samples and a digital delay line configured to provide a second trigger signal to the CDS circuit component, to cause the CDS to generate a second one of the voltage samples.

According to a fourth aspect, the analog circuit of the second aspect includes an analog delay line coupled to the input of the analog circuit and configured to provide the voltage signal to the CDS circuit component.

According to a fifth aspect, the analog circuit of any of the second through fourth aspects includes an attenuator configured to reduce the voltage signal.

According to a sixth aspect, the lidar system of any of the second through fifth aspects includes an analog-to-digital (ADC) converter coupled to an output of the CDS circuit component and configured to generate a digital value indicative of the amount of energy in the detected light pulse.

According to a seventh aspect, the analog circuit of any of the preceding aspects is a first one of a plurality of analog circuits included in the lidar system, each of the plurality of analog circuits corresponding to a different respective gain.

According to an eighth aspect, the plurality of analog circuits of the seventh aspect includes a first analog circuit to process high-gain signals and a second analog circuit to process low-gain signals.

According to a ninth aspect, the plurality of analog circuits further includes a third analog circuit to process ultra-low-gain signals.

According to a tenth aspect, the detector of the lidar system of either of the eighth or ninth aspects is configured to output the electric signal in the form of a current signal. The lidar system further includes an integrator configured to convert the current signal to a voltage signal and provide the voltage signal on the input of the first analog circuit.

According to an eleventh aspect, in the lidar system of any of the eighth through tenth aspects, the input of the second analog circuit is coupled to an anode or a cathode of the detector.

According to a twelfth aspect, the lidar system of any of the preceding aspects further includes processing hardware configured to generate (i) a pixel based on the time of arrival of the detected light pulse and (ii) an indication of reflectivity of one of the targets based on the output signal from the analog circuit.

According to a thirteenth aspect, the analog circuit of the twelfth aspect is further configured to measure an amount of energy contained in an emitted light pulse to which the detected light pulse corresponds, wherein the analog circuit is configured to generate the indication of reflectivity using (i) the amount of energy contained in the emitted light pulse and (ii) the amount of energy contained in the detected light pulse.

According to a fourteenth aspect, in the lidar system of any of the preceding aspects, the detector is an avalanche photodiode detector (APD).

According to a fifteenth aspect, the avalanche photodiode of the fourteenth aspect is an Indium Gallium Arsenide (InGaAs) APD.

According to a sixteenth aspect, in the lidar system of any of the preceding aspects, the detector is configured to detect the light pulse with an energy in the range of 5 aJ to 600 pJ.

According to a seventeenth aspect, the lidar system of any of the preceding aspects further includes a scanner coupled to the light sources and configured to direct the emitted light pulses across a field of regard.

According to an eighteenth aspect, a method in a lidar system for processing light pulses includes emitting light pulses by a light source; generating, by a detector, an electric signal corresponding to a light pulse from one of the light pulses scattered by a target; determining, by a pulse detection circuit and based on the electrical signal, a time of arrival of the detected light pulse; and generating, by an analog circuit and based on the electric signal, an output signal indicative of an amount of energy contained in the detected light pulse.

According to a nineteenth aspect, the method of the eighteenth aspect further includes receiving, at an input to a correlated double-sampling (CDS) circuit component, a voltage signal and determining, at the CDS circuit component, a difference between voltage samples, wherein the difference is indicative of the amount of energy in the detected light pulse.

According to a twentieth aspect, in the method of the nineteenth aspect, receiving the voltage signal includes: receiving, from a comparator coupled to the input of the analog circuit and set to a baseline value, a first trigger signal at the CDS circuit component; generating a first one of the voltage samples in response to the first trigger signal; receiving, rom a digital delay line, a second trigger signal at the CDS circuit component; and generating a second one of the voltage samples in response to the second trigger signal.

According to a twenty-first aspect, the method of either of the nineteenth or twentieth aspects further includes reducing, via an attenuator, the voltage signal.

According to a twenty-second aspect, the method of any of the nineteenth through twenty-first aspects further includes generating, via an analog-to-digital (ADC) converter coupled to an output of the CDS circuit component, a digital value indicative of the amount of energy in the detected light pulse.

According to a twenty-third aspect, in the method of any of the nineteenth through twenty-second aspects, the analog circuit is a first one of a plurality of analog circuits. Generating the output signal includes processing signals with different respective gains at each of the plurality of analog circuits.

According to a twenty-fourth aspect, in the method of the twenty-third aspect, generating the output signal further includes processing, at a first analog circuit, high-gain signals, and processing, at a second analog circuit, low-gain signals.

According to a twenty-fifth aspect, in the method of the twenty-fourth aspect, generating the output signal further includes processing, at a third analog circuit, ultra-low-gain signals.

According to a twenty-sixth aspect, the method of either of the twenty-fourth or twenty-fifth aspects further includes: outputting, via the detector, the electric signal in the form of a current signal; converting, via an integrator, a current signal to a voltage signal; and providing, via the integrator, the voltage signal on the input of the first analog circuit.

According to a twenty-seventh aspect, the method of any of the twenty-fourth through twenty-sixth aspects further includes receiving, at the input of the second analog circuit, an anode voltage or a cathode voltage of the detector.

According to a twenty-eighth aspect, the method of any of the eighteenth through twenty-seventh aspects includes generating, via processing hardware, (i) a pixel based on the time of arrival of the detected light pulse and (ii) an indication of reflectivity of the target based on the output signal from the analog circuit.

According to a twenty-ninth aspect, in the method of the twenty-eighth aspect, generating the indication of reflectivity of the target includes calculating, via processing hardware, a reflectivity of the target based on an amount of energy contained in an emitted light pulse of the light pulses emitted by the light source and the amount of energy contained in the detected light pulse.

According to a thirtieth aspect, in the method of the twenty-ninth aspect, calculating the reflectivity includes determining, using the analog circuit, an amount of energy contained in an emitted light pulse corresponding to the detected light pulse.

According to a thirty-first aspect, the method of any of the eighteenth through thirtieth aspects further includes directing, via a scanner coupled to the light sources, emitted light pulses across a field of regard.

General Considerations

In some cases, a computing device may be used to implement various modules, circuits, systems, methods, or algorithm steps disclosed herein. As an example, all or part of a module, circuit, system, method, or algorithm disclosed herein may be implemented or performed by a general-purpose single- or multi-chip processor, a digital signal processor (DSP), an ASIC, a FPGA, any other suitable programmable-logic device, discrete gate or transistor logic, discrete hardware components, or any suitable combination thereof. A general-purpose processor may be a microprocessor, or, any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In particular embodiments, one or more implementations of the subject matter described herein may be implemented as one or more computer programs (e.g., one or more modules of computer-program instructions encoded or stored on a computer-readable non-transitory storage medium). As an example, the steps of a method or algorithm disclosed herein may be implemented in a processor-executable software module which may reside on a computer-readable non-transitory storage medium. In particular embodiments, a computer-readable non-transitory storage medium may include any suitable storage medium that may be used to store or transfer computer software and that may be accessed by a computer system. Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs (e.g., compact discs (CDs), CD-ROM, digital versatile discs (DVDs), blue-ray discs, or laser discs), optical disc drives (ODDs), magneto-optical discs, magneto-optical drives, floppy diskettes, floppy disk drives (FDDs), magnetic tapes, flash memories, solid-state drives (SSDs), RAM, RAM-drives, ROM, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

In some cases, certain features described herein in the context of separate implementations may also be combined and implemented in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

While operations may be depicted in the drawings as occurring in a particular order, this should not be understood as requiring that such operations be performed in the particular order shown or in sequential order, or that all operations be performed. Further, the drawings may schematically depict one more example processes or methods in the form of a flow diagram or a sequence diagram. However, other operations that are not depicted may be incorporated in the example processes or methods that are schematically illustrated. For example, one or more additional operations may be performed before, after, simultaneously with, or between any of the illustrated operations. Moreover, one or more operations depicted in a diagram may be repeated, where appropriate. Additionally, operations depicted in a diagram may be performed in any suitable order. Furthermore, although particular components, devices, or systems are described herein as carrying out particular operations, any suitable combination of any suitable components, devices, or systems may be used to carry out any suitable operation or combination of operations. In certain circumstances, multitasking or parallel processing operations may be performed. Moreover, the separation of various system components in the implementations described herein should not be understood as requiring such separation in all implementations, and it should be understood that the described program components and systems may be integrated together in a single software product or packaged into multiple software products.

Various implementations have been described in connection with the accompanying drawings. However, it should be understood that the figures may not necessarily be drawn to scale. As an example, distances or angles depicted in the figures are illustrative and may not necessarily bear an exact relationship to actual dimensions or layout of the devices illustrated.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes or illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend.

The term "or" as used herein is to be interpreted as an inclusive or meaning any one or any combination, unless expressly indicated otherwise or indicated otherwise by context. Therefore, herein, the expression "A or B" means "A, B, or both A and B." As another example, herein, "A, B or C" means at least one of the following: A; B; C; A and B; A and C; B and C; A, B and C. An exception to this definition will occur if a combination of elements, devices, steps, or operations is in some way inherently mutually exclusive.

As used herein, words of approximation such as, without limitation, "approximately, "substantially," or "about" refer to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skill in the art recognize the modified feature as having the required characteristics or capabilities of the unmodified feature. In general, but subject to the preceding discussion, a numerical value herein that is modified by a word of approximation such as "approximately" may vary from the stated value by ±0.5%, ±1%, ±2%, ±3%, ±4%, ±5%, ±10%, ±12%, or ±15%.

As used herein, the terms "first," "second," "third," etc. may be used as labels for nouns that they precede, and these terms may not necessarily imply a particular ordering (e.g., a particular spatial, temporal, or logical ordering). As an example, a system may be described as determining a "first result" and a "second result," and the terms "first" and "second" may not necessarily imply that the first result is determined before the second result.

As used herein, the terms "based on" and "based at least in part on" may be used to describe or present one or more factors that affect a determination, and these terms may not exclude additional factors that may affect a determination. A determination may be based solely on those factors which are presented or may be based at least in part on those factors. The phrase "determine A based on B" indicates that B is a factor that affects the determination of A. In some instances, other factors may also contribute to the determination of A. In other instances, A may be determined based solely on B.

What is claimed is:

1. A lidar system comprising:
   a light source configured to emit light pulses; and
   a receiver configured to receive light pulses from some of the light pulses scattered by one or more targets, the receiver including:
   a detector configured to detect a light pulse and output an electric signal corresponding to the detected light pulse,
   a pulse detection circuit configured to determine, based on the electric signal, a time of arrival of the detected light pulse, and
   an analog circuit configured to generate, based on the electric signal, an output signal indicative of an amount of energy contained in the detected light pulse, wherein the analog circuit includes a comparator configured to provide a first trigger signal to a correlated double-sampling (CDS) circuit component to generate a first voltage sample and a digital delay component configured to provide a second trigger signal to the CDS circuit component to generate a second voltage sample, wherein a difference between the first voltage sample and the second voltage sample is indicative of the amount of energy in the detected light pulse.

2. The lidar system of claim 1, wherein the analog circuit includes:
   the comparator is set to a baseline value.

3. The lidar system of claim 1, wherein the analog circuit further includes:
   an analog delay line coupled to the analog circuit and configured to provide a voltage signal to the CDS circuit component.

4. The lidar system of claim 1, wherein the analog circuit further includes:
   an attenuator configured to reduce a voltage signal to the CDS circuit component.

5. The lidar system of claim 1, further comprising:
   an analog-to-digital (ADC) converter coupled to an output of the CDS circuit component and configured to generate a digital value indicative of the amount of energy in the detected light pulse.

6. The lidar system of claim 1, wherein:
   the analog circuit is a first one of a plurality of analog circuits included in the lidar system, each of the plurality of analog circuits corresponding to a different respective gain.

7. The lidar system of claim 6, wherein the plurality of analog circuits includes:
a first analog circuit to process high-gain signals; and
a second analog circuit to process low-gain signals.

8. The lidar system of claim 7, wherein the plurality of analog circuits further includes:
a third analog circuit to process ultra-low-gain signals.

9. The lidar system of claim 7, wherein:
the detector is configured to output the electric signal in a form of a current signal;
the lidar system further comprising:
an integrator configured to convert the current signal to a voltage signal and
provide the voltage signal to the first analog circuit.

10. The lidar system of claim 7, wherein:
the second analog circuit is coupled to an anode or a cathode of the detector.

11. The lidar system of claim 1, the lidar system further comprising:
processing hardware configured to generate (i) a pixel based on the time of arrival of the detected light pulse and (ii) an indication of reflectivity of one of the targets based on the output signal from the analog circuit.

12. The lidar system of claim 11, wherein the analog circuit is further configured to:
measure an amount of energy contained in an emitted light pulse to which the detected light pulse corresponds,
wherein the analog circuit is configured to generate the indication of reflectivity using (i) the amount of energy contained in the emitted light pulse and (ii) the amount of energy contained in the detected light pulse.

13. The lidar system of claim 1, wherein the detector is an avalanche photodiode detector (APD).

14. The lidar system of claim 13, wherein the avalanche photodiode is an Indium Gallium Arsenide (InGaAs) APD.

15. The lidar system of claim 1, wherein the detector is configured to detect the light pulse with an energy in a range of 5 aJ to 600 pJ.

16. The lidar system of claim 1, the lidar system further comprising:
a scanner coupled to the light source and configured to direct the emitted light pulses across a field of regard.

17. A method in a lidar system for processing light pulses, the method comprising:
emitting light pulses by a light source;
generating, by a detector, an electric signal corresponding to a detected light pulse from one of the light pulses scattered by a target;
determining, by a pulse detection circuit and based on the electric signal, a time of arrival of the detected light pulse; and
generating, by an analog circuit and based on the electric signal, an output signal indicative of an amount of energy contained in the detected light pulse, wherein the analog circuit includes a comparator configured to provide a first trigger signal to a correlated double-sampling (CDS) circuit component to generate a first voltage sample and a digital delay component configured to provide a second trigger signal to the CDS circuit component to generate a second voltage sample, wherein a difference between the first voltage sample and the second voltage sample is indicative of the amount of energy in the detected light pulse.

18. The method of claim 17, wherein
the comparator is set to a baseline value.

19. The method of claim 17, further comprising:
reducing, via an attenuator, a voltage signal to the CDS circuit component.

20. The method of claim 17, further comprising:
generating, via an analog-to-digital (ADC) converter coupled to an output of the CDS circuit component, a digital value indicative of the amount of energy in the detected light pulse.

21. The method of claim 17, wherein the analog circuit is a first one of a plurality of analog circuits and generating the output signal includes processing signals with different respective gains at each of the plurality of analog circuits.

22. The method of claim 21, wherein generating the output signal further includes:
processing, at a first analog circuit, high-gain signals; and
processing, at a second analog circuit, low-gain signals.

23. The method of claim 22, wherein generating the output signal further includes:
processing, at a third analog circuit, ultra-low-gain signals.

24. The method of claim 22, further comprising:
outputting, via the detector, the electric signal in a form of a current signal;
converting, via an integrator, a current signal to a voltage signal; and
providing, via the integrator, the voltage signal to the first analog circuit.

25. The method of claim 22, further comprising:
receiving, at the second analog circuit, an anode voltage or a cathode voltage of the detector.

26. The method of claim 17, further comprising:
generating, via processing hardware, (i) a pixel based on the time of arrival of the detected light pulse and (ii) an indication of reflectivity of the target based on the output signal from the analog circuit.

27. The method of claim 26, wherein generating the indication of reflectivity of the target includes:
calculating, via processing hardware, a reflectivity of the target based on an amount of energy contained in an emitted light pulse of the light pulses emitted by the light source and the amount of energy contained in the detected light pulse.

28. The method of claim 27, wherein calculating the reflectivity includes:
determining, using the analog circuit, an amount of energy contained in an emitted light pulse corresponding to the detected light pulse.

29. The method of claim 17, further comprising:
directing, via a scanner coupled to the light source, emitted light pulses across a field of regard.

* * * * *